(12) United States Patent
Cao et al.

(10) Patent No.: US 12,418,690 B2
(45) Date of Patent: Sep. 16, 2025

(54) SCHEDULING TRANSMISSION METHOD AND APPARATUS

(71) Applicant: HUAWEI TECHNOLOGIES CO., LTD., Guangdong (CN)

(72) Inventors: Youlong Cao, Shanghai (CN); Shuri Liao, Shanghai (CN); Erkai Chen, Kista (SE); Shengyue Dou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 146 days.

(21) Appl. No.: 18/349,921

(22) Filed: Jul. 10, 2023

(65) Prior Publication Data

US 2023/0353806 A1 Nov. 2, 2023

Related U.S. Application Data

(63) Continuation of application No. PCT/CN2021/072556, filed on Jan. 18, 2021.

(51) Int. Cl.
*H04N 21/262* (2011.01)
*H04N 21/235* (2011.01)

(52) U.S. Cl.
CPC ..... *H04N 21/26208* (2013.01); *H04N 21/235* (2013.01)

(58) Field of Classification Search
CPC .......... H04N 21/26208; H04N 21/235; H04W 72/566

(Continued)

(56) References Cited

U.S. PATENT DOCUMENTS 7,958,532 B2 * 6/2011 Paul ............... H04N 21/234327
725/135
2010/0085932 A1 * 4/2010 Kim ....................... H04L 47/20
370/329

(Continued)

FOREIGN PATENT DOCUMENTS

CN 1878142 A 12/2006
CN 101232716 A 7/2008

(Continued)

OTHER PUBLICATIONS

3GPP TR 26.928 V16.1.0 3rd Generation Partnership Project;Technical Specification Group Services and System Aspects; Extended Reality (XR) in 5G (Release 16) Dec. 2020 total 131 pages.

(Continued)

*Primary Examiner* — Adil Ocak

(57) ABSTRACT

This disclosure provides a scheduling transmission method and an apparatus. According to the method, a scheduling priority of a terminal is determined based on an instantaneous rate of the terminal and a service type of a first service of the terminal, and the first service is transmitted with the terminal based on the scheduling priority of the terminal. The instantaneous rate of the terminal is positively correlated with the scheduling priority of the terminal, and a target video frame correct ratio of the first service is greater than a first threshold. The solutions of this application can be widely used in the fields of communication technologies, artificial intelligence, Internet of vehicles, Internet of smart home, and the like.

17 Claims, 12 Drawing Sheets

(58) Field of Classification Search
USPC .......................................................... 725/93
See application file for complete search history.

(56) References Cited

U.S. PATENT DOCUMENTS

2016/0278111 A1* 9/2016 Li ............................ H04L 47/30
2018/0109468 A1   4/2018 Sridhar et al.
2019/0342597 A1* 11/2019 Li ....................... H04N 21/2402

FOREIGN PATENT DOCUMENTS

| CN | 101568157 A | 10/2009 |
| CN | 101860916 A | 10/2010 |
| CN | 102404745 A | 4/2012 |
| WO | 2012142072 A1 | 10/2012 |

OTHER PUBLICATIONS

3GPP TSG RAN WG1 #103-e, R1-2007698,Discussion on XR applications, traffic model and evaluation methodologies.vivo,e-Meeting, Oct. 26-Nov. 13, 2020,total 20 pages.
3GPP TSG RAN WG1 #103-e, R1-2007976, Discussion on applications, traffic model and evaluation methodology for XR,ZTE, Sanechips,e-Meeting, Oct. 26-Nov. 13, 2020,total 14 pages.
3GPP TSG RAN WG1 #103-e, R1-2009280, Evaluation Methodology for XR,Qualcomm Incorporated,e-Meeting, Oct. 26-Nov. 13, 2020,total 13 pages.

* cited by examiner

SCHEDULING TRANSMISSION METHOD AND APPARATUS

CROSS-REFERENCE TO RELATED APPLICATIONS

This application is a continuation of International Application No. PCT/CN2021/072556, filed on Jan. 18, 2021, the disclosure of which is hereby incorporated by reference in its entirety.

TECHNICAL FIELD

Embodiments of this application relate to the field of communication technologies, and in particular, to a scheduling transmission method and an apparatus.

BACKGROUND

In recent years, with continuous progress and improvement of an extended reality (extended reality, XR) technology, a related industry has developed vigorously. Nowadays, the XR technology has entered various fields closely related to production and life of people, for example, education, entertainment, military affairs, medical care, environmental protection, transportation, and public health.

In a process of transmitting an XR service, to ensure that a decoder at a receiver end can normally decode video content of the XR service and ensure user experience, a requirement on a video frame correct ratio of the XR service is high. For example, in a single-stream transmission mode, a video frame correct ratio of the XR service is required to be about 99%. In a multi-stream transmission mode, a video frame correct ratio of a base layer (base layer, BL) of the XR service is required to be about 99.99%. A video frame correct ratio of an enhancement layer (enhancement layer, EL) of the XR service is required to be about 50%. However, in an existing scheduling algorithm, for example, a round and robin (round and robin, RR) algorithm or a proportional fairness (proportional fairness, PF) algorithm, only scheduling fairness among a plurality of scheduled terminals in one cell is considered. For example, a terminal in a poor channel state also has a scheduling opportunity. However, the terminal with poor channel quality cannot meet a video frame correct ratio requirement of the XR service, and consequently, a user satisfaction rate in the cell is low. In addition, scheduling the terminal with poor channel quality causes a waste of scheduling resources, and consequently system performance deteriorates.

SUMMARY

This disclosure provides a scheduling transmission method and an apparatus, to resolve a problem that a terminal with poor channel quality in an existing scheduling algorithm cannot meet a video frame correct ratio requirement of an XR service, and consequently a user satisfaction rate is low, and a resource is wasted.

To achieve the foregoing objectives, the following technical solutions are used in embodiments of this application.

According to a first aspect, a scheduling transmission method is provided. The method may be performed by an access network device, a chip in an access network device, or a function module in an access network device. The method includes: determining a scheduling priority of a terminal based on an instantaneous rate of the terminal and a service type of a first service of the terminal, and transmitting the first service with the terminal based on the determined scheduling priority of the terminal. The instantaneous rate of the terminal is positively correlated with the scheduling priority of the terminal, and a target video frame correct ratio of the first service is greater than a first threshold.

Based on the method in the first aspect, in a scenario in which the first service whose target video frame correct ratio is greater than the first threshold is transmitted with the terminal, the scheduling priority of the terminal may be determined with reference to the instantaneous rate of the terminal. In this way, a terminal with a high instantaneous rate is preferentially scheduled to transmit the first service, and a quantity of correctly transmitted video frames of the first service of the terminal with a high instantaneous rate is maximized, to reach the target video frame correct ratio of the first service, and meet a transmission requirement of the first service, thereby improving a user satisfaction rate in a cell.

In a possible design, the determining a scheduling priority of the terminal based on an instantaneous rate of the terminal includes: determining the scheduling priority of the terminal based on the instantaneous rate of the terminal and a first parameter, where the first parameter indicates a first video frame correct ratio of the first service.

Based on this possible design, in addition to the instantaneous rate of the terminal, the scheduling priority of the terminal may be further determined with reference to the video frame correct ratio of the first service of the terminal, to ensure that the video frame correct ratio when the terminal transmits the first service reaches the target video frame correct ratio as much as possible, thereby satisfying user experience.

In a possible design, when the first video frame correct ratio of the first service is less than the target video frame correct ratio of the first service, the first video frame correct ratio of the first service is positively correlated with the scheduling priority of the terminal. To be specific, when the video frame correct ratio of the first service of the terminal is closer to the target video frame correct ratio, the scheduling priority of the terminal is higher, so that a terminal with a high video frame correct ratio is preferentially scheduled, and a video frame correct ratio requirement of the first service of the terminal is met.

In a possible design, when the first video frame correct ratio of the first service is greater than the target video frame correct ratio of the first service, the first video frame correct ratio of the first service is negatively correlated with the scheduling priority of the terminal, or the scheduling priority of the terminal remains unchanged. The scheduling priority of the terminal is lower than a scheduling priority corresponding to the target video frame correct ratio of the first service.

Based on this possible design, when the video frame correct ratio is higher than the target video frame correct ratio, the scheduling priority of the terminal may be kept unchanged or the scheduling priority of the terminal may be slightly reduced, and data scheduling is performed on another terminal, to ensure that the another terminal also has a scheduling opportunity, thereby implementing scheduling fairness.

In a possible design, that the scheduling priority of the terminal is lower than the scheduling priority corresponding to the target video frame correct ratio of the first service includes: A difference between a value corresponding to the scheduling priority corresponding to the target video frame correct ratio of the first service and a value corresponding to the scheduling priority of the terminal is less than a second threshold.

Based on the possible design, for a terminal whose video frame correct ratio exceeds the target video frame correct ratio, a scheduling priority of the terminal is slightly reduced, but the scheduling priority cannot be excessively low, to ensure a video frame correct ratio requirement of the terminal.

In a possible design, the determining a scheduling priority of the terminal based on the instantaneous rate of the terminal and the service type of the first service of the terminal includes: when a second video frame correct ratio of the first service is greater than a third threshold, determining the scheduling priority of the terminal based on the instantaneous rate of the terminal and the service type of the first service of the terminal; and when the second video frame correct ratio of the first service is less than or equal to the third threshold, terminating transmission of the first service.

Based on the possible design, a terminal with a high video frame correct ratio may be scheduled, and a terminal with a low video frame correct ratio is not scheduled, to avoid a waste of resources and improve system performance.

In a possible design, the method further includes: obtaining a video frame correct ratio of the first service through calculation based on a quantity of correctly transmitted video frames in video frames of the first service and a total quantity of video frames of the first service; or determining a video frame correct ratio of the first service based on a packet error ratio of the first service.

Based on the possible design, the access network device may obtain the video frame correct ratio of the first service of the terminal through calculation, thereby improving efficiency of obtaining the video frame correct ratio of the first service of the terminal.

In a possible design, each data packet of the first service carries first information, and the first information is used to indicate a video frame to which the data packet belongs. The method further includes: The access network device determines, based on the first information carried in the data packet, the video frame to which the data packet belongs; and if all data packets belonging to a same video frame are correctly transmitted, determining that the video frame is correctly transmitted; or if there is an incorrectly transmitted data packet in data packets belonging to a same video frame, determining that the video frame is not correctly transmitted.

Based on the possible design, whether a video frame to which a data packet belongs is correctly transmitted is determined by adding, to the data packet of the first service, information used to indicate the video frame to which the data packet belongs, to reduce signaling overheads and simplify a system design.

In a possible design, the method further includes: The access network device sends second information to the terminal, where the second information is used to indicate to report the video frame correct ratio of the first service.

Based on the possible design, the access network device may indicate the terminal to report the video frame correct ratio of the first service, to improve accuracy of obtaining, by the access network device, the video frame correct ratio of the first service.

In a possible design, the method further includes: The access network device receives third information from the terminal, where the third information indicates the video frame correct ratio of the first service.

Based on the possible design, the terminal may report the video frame correct ratio of the first service to the access network device, to reduce power consumption caused by obtaining, by the access network device, the video frame correct ratio of the first service.

In a possible design, the second information is carried in radio resource control (radio resource control, RRC) signaling or downlink control information (downlink control information, DCI), and the third information is carried in media access control (media access control element, MAC CE) signaling or RRC signaling.

Based on the possible design, the video frame correct ratio of the first service may be effectively and flexibly reported between the access network device and the terminal by using the RRC or the MAC CE, and a system signaling design is simplified.

In a possible design, the third information corresponds to a video frame correct ratio range in which the video frame correct ratio of the first service is located, to reduce signaling overheads.

In a possible design, the transmitting the first service with the terminal includes: sending a data packet of the first service to the terminal, or receiving a data packet of the first service from the terminal, where the data packet of the first service is a data packet in a single-stream transmission mode, or the data packet of the first service is an EL data packet in a multi-layer transmission mode.

Based on this possible design, an applicable scenario of embodiments of this application can be effectively and flexibly deployed.

In a possible design, when the data packet of the first service is the EL data packet in the multi-layer transmission mode, the method further includes: obtaining a scheduling priority of the BL data packet of the terminal through calculation based on the instantaneous rate of the terminal, a historical transmission rate of the terminal, and an offset value. Based on the possible design, the BL data packet is preferentially scheduled by using a PF scheduling algorithm, to ensure that basic content of the video frame is correctly transmitted.

In a possible design, the method further includes: The access network device determines, based on a transmission characteristic of the data packet of the first service, that the data packet of the first service is the data packet of the first service, where the transmission characteristic includes a transmission periodicity and/or a transmitted data volume; or the access network device determines, based on a radio bearer used to transmit the data packet of the first service and a correspondence between the radio bearer and a service, that the data packet of the first service is the data packet of the first service; or the access network device determines, based on a quality of service identifier carried in the data packet of the first service and a correspondence between the quality of service identifier and a service, that the data packet of the first service is the data packet of the first service.

Based on the possible design, the service transmitted by the terminal may be flexibly and effectively identified, by using an inherent transmission characteristic of the data packet of the first service and/or a transmission resource that matches a transmission requirement of the first service, as a first service whose target video frame correct ratio is greater than the first threshold.

According to a second aspect, this application provides a communication apparatus. The communication apparatus may be an access network device, or a chip or a system on chip in an access network device, or may be a function module that is in a communication apparatus and that is configured to implement the method according to the first aspect or any one of the possible designs of the first aspect. The communication apparatus may implement functions performed by the communication apparatus in the foregoing aspects or the possible designs, and the functions may be implemented by hardware executing corresponding software. The hardware or the software includes one or more modules corresponding to the functions. For example, the communication apparatus may include a processing unit and a transceiver unit.

The processing unit is configured to: determine a scheduling priority of a terminal based on an instantaneous rate of the terminal and a service type of a first service of the terminal, and control the transceiver unit to transmit the first service with the terminal based on the scheduling priority of the terminal.

For a specific implementation of the communication apparatus, refer to behavior functions of the access network device in the scheduling transmission method provided in the first aspect or any one of the possible designs of the first aspect. Details are not described herein again. Therefore, the access network device provided in the second aspect achieves a same beneficial effect as the first aspect or any one of the possible designs of the first aspect.

According to a third aspect, a communication apparatus is provided. The communication apparatus may be an access network device, or a chip or a system on chip in an access network device. The communication apparatus may implement functions performed by the access network device in the foregoing aspects or the possible designs, and the functions may be implemented by hardware. In a possible design, the communication apparatus may include a processor and a communication interface. The processor may be configured to support the communication apparatus in implementing the function according to the first aspect or any one of the possible designs of the first aspect. For example, the processor is configured to: determine a scheduling priority of a terminal based on an instantaneous rate of the terminal and a service type of a first service of the terminal, and control, based on the scheduling priority of the terminal, the communication interface to transmit the first service with the terminal. In another possible design, the communication apparatus may further include a memory. The memory is configured to store computer-executable instructions and data that are necessary for the communication apparatus. When the communication apparatus runs, the processor executes the computer-executable instructions stored in the memory, so that the communication apparatus performs the scheduling transmission method according to the first aspect or any one of the possible designs of the first aspect.

According to a fourth aspect, a computer-readable storage medium is provided. The computer-readable storage medium may be a readable non-volatile storage medium. The computer-readable storage medium stores instructions. When the instructions are run on a computer, the computer is enabled to perform the scheduling transmission method according to the first aspect or any one of the possible designs of the foregoing aspects.

According to a fifth aspect, a computer program product including instructions is provided. When the computer program product runs on a computer, the computer is enabled to perform the scheduling transmission method according to the first aspect or any one of the possible designs of the foregoing aspects.

According to a sixth aspect, a communication apparatus is provided. The communication apparatus may be an access network device or a chip or a system on chip in an access network device. The communication apparatus includes one or more processors and one or more memories. The one or more memories are coupled to the one or more processors, and the one or more memories are configured to store computer program code. The computer program code includes computer instructions. When the one or more processors execute the computer instructions, the communication apparatus is enabled to perform the scheduling transmission method according to the first aspect or any one of the possible designs of the first aspect.

For technical effects achieved by any one of the designs of the third aspect to the sixth aspect, refer to the technical effects achieved by any one of the first aspect or the possible designs of the first aspect. Details are not described again.

According to a seventh aspect, an embodiment of this application provides a communication system. The communication system may include a terminal and the communication apparatus according to the second aspect or the sixth aspect.

DESCRIPTION OF EMBODIMENTS

Before embodiments of this application are described, some terms in embodiments of this application are explained.

An XR service is a general term of extended reality-related services, and includes: a virtual reality (virtual reality, VR) service, an augmented reality (augmented reality, AR) service, and a mixed reality (mixed reality, MR) service. The VR service mainly means to render visual and audio scenarios to simulate, as much as possible, sensory stimulation of vision and audio in a real world to a user. The AR service mainly means providing additional visual or auditory information or manually generated content in a real environment sensed by the user. The MR service is an advanced form of the AR service. One of implementations of the MR service is inserting some virtual elements into a physical scenario, to provide the user with immersive experience in which the elements are a part of a real scenario.

A transmission mode of the XR service may include a single-stream transmission mode and a multi-stream transmission mode. The following describes the two transmission modes and a scheduling algorithm in each transmission mode.

1. Single-Stream Transmission Mode.

Figure 1A:
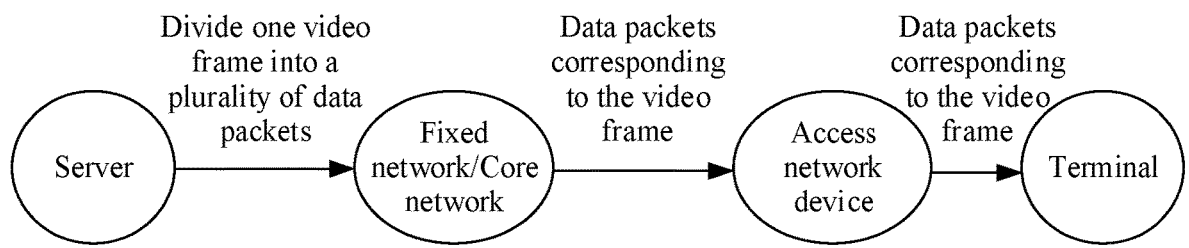
FIG. 1a is a schematic diagram of a single-stream transmission mode.

The single-stream transmission mode may mean that a data packet corresponding to a video frame of the XR service is transmitted by using a data stream. For example, FIG. 1a shows a process of sending a video frame of the XR service to a terminal in the single-stream transmission mode. As shown in FIG. 1a, an application server may divide the video frame of the XR service into dozens of data packets (for example, Internet Protocol (internet protocol, IP) packets), and send the dozens of data packets to a fixed network/core network. The fixed network/core network sends the dozens of data packets to an access network device, and the access network device sequentially sends the dozens of data packets to the terminal by using a data stream.

A scheduling algorithm of the single-stream transmission mode may include an RR algorithm, a PF algorithm, and the like. In the RR algorithm, during air interface resource allocation, a plurality of to-be-scheduled terminals are arranged into a queue. The first terminal in the queue is scheduled in a round and robin manner, and the scheduled terminal is moved to the end. The RR algorithm can ensure that the plurality of terminals have a same scheduling opportunity. The RR algorithm can be regarded as fair scheduling.

In the PF algorithm, a scheduling priority of a terminal is determined based on an instantaneous rate of the terminal and weighted average throughput, and a to-be-scheduled terminal is selected according to the determined scheduling priority. In addition, maximum throughput of a system and fairness of the terminal are considered. In this application, a scheduling priority obtained through calculation by using the PF algorithm is referred to as a PR A scheduling priority PF of a terminal satisfies the following formula (1):

$$PF = \frac{R_{instant}}{R_{history}} \quad \text{Formula (1)}$$

In the formula (1), $R_{instant}$ is an instantaneous rate of the terminal, and $R_{instant}$ may be obtained through calculation based on a current channel state parameter (for example, channel state information (channel state information, CSI) or a rank indication (rank indication, RI)) of the terminal. $R_{history}$ is a historical transmission rate of the terminal, and $R_{history}$ is an average rate at which the terminal receives a data packet in a time period before a current moment.

It can be learned from the formula (1) that, if there are a plurality of to-be-scheduled terminals in a same cell, when an access network device continuously schedules a terminal with good channel quality, a historical transmission rate of the terminal gradually increases, so that a scheduling priority of the terminal gradually decreases, and the access network device schedules another terminal with a high priority. If channel quality of a terminal is poor and the terminal cannot be scheduled by the access network device for a long time, a historical transmission rate of the terminal decreases, and a scheduling priority of the terminal obtained through calculation by using the formula (1) increases, so that the terminal obtains a scheduling opportunity.

2. Multi-Stream Transmission Mode.

The multi-stream transmission mode may mean that transmission resources are divided in time, space, and frequency domain, to obtain a base layer (base layer, BL) and an enhancement layer (enhancement layer, EL). The BL is used to transmit a data packet corresponding to a video frame of the XR service. The data packet (which may be referred to as a BL data packet for short) transmitted on the BL may enable a decoder to completely and normally decode basic video content, thereby ensuring basic user experience. A data volume of the data packet transmitted on the BL is small. The EL is used to transmit detail information corresponding to the data packet. The detail information may be used to enhance image quality corresponding to the data packet, and a data volume of the detail information (which may be referred to as an EL data packet for short) corresponding to the data packet transmitted on the EL is large.

Figure 1B:
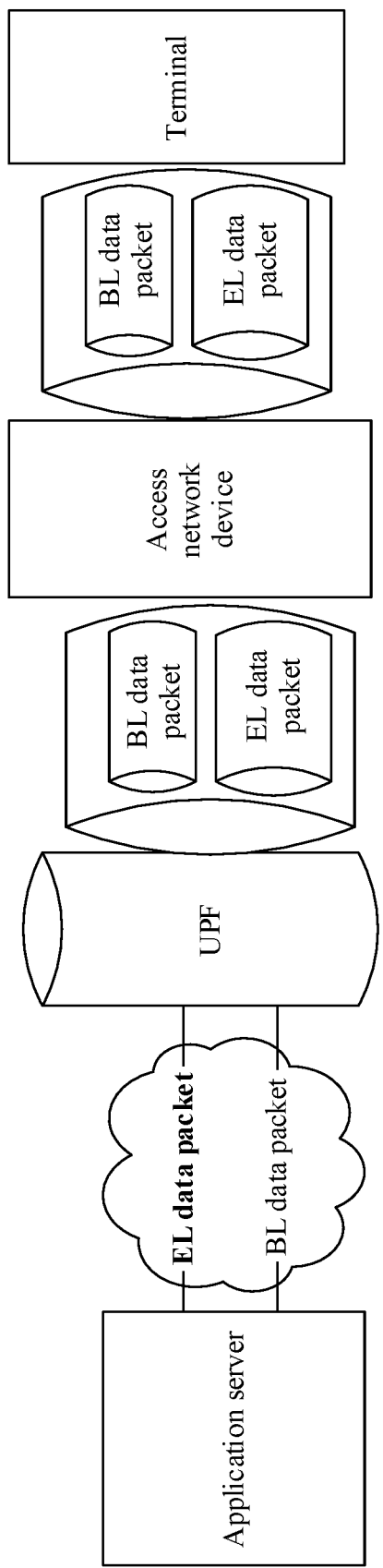
FIG. 1b is a schematic diagram of a multi-stream transmission mode.

For example, FIG. 1b shows a process of sending a video frame of the XR service to a terminal in the multi-stream transmission mode. As shown in FIG. 1b, an application server may perform encoding processing on a data packet corresponding to the video frame of the XR service to obtain a BL data packet and an EL data packet, and send the BL data packet and the EL data packet to a UPF. The UPF forwards the BL data packet and the EL data packet to an access network device, and the access network device sends the BL data packet and the EL data packet to the terminal.

In the multi-stream transmission mode, for both the BL data packet and the EL data packet, a scheduling priority of the terminal may be obtained through calculation by using the PF algorithm shown in the foregoing formula (1). Because the BL data packet carries basic video content, and the EL data packet carries a detail corresponding to the basic video content, quality of service (quality of service, QoS) requirements of the BL data packet and the EL data packet are different. For example, a QoS requirement of the BL data packet is greater than a QoS requirement of the EL data packet. For a same terminal, to ensure the QoS requirement of the data packet, a scheduling priority of the BL data packet may be configured to be higher than a scheduling priority of the EL data packet. For example, the scheduling priority BL_PF of the BL data packet and the scheduling priority EL_PF of the EL data packet respectively satisfy the following formulas:

$$BL\_PF = \frac{R_{instant}}{R_{history}} + \Delta$$

$$EL\_PF = \frac{R_{instant}}{R_{history}}$$

Related descriptions of $R_{instant}$ and $R_{history}$ are described above. Details are not described again. $\Delta$ is a preset offset value greater than 0, and $\Delta$ can ensure that the scheduling priority of the BL data packet is higher than the scheduling priority of the EL data packet.

It can be known from the foregoing description that the scheduling algorithms in the single-stream transmission mode and the multi-stream transmission mode can ensure scheduling fairness among a plurality of scheduled terminals in one cell.

However, a video frame correct ratio requirement of the XR service cannot be ignored. Optionally, a user has a high requirement for a video frame correct ratio of the XR service. For example, a user-level evaluation indicator of the XR service indicates that: under a specific delay constraint, in the single-stream transmission mode, the user requires that the video frame correct ratio of the XR service is greater than 99%; and in the multi-stream transmission mode, the user requires that a BL frame correct ratio of the XR service is greater than 99.99%, and requires that an EL frame correct ratio is greater than 50%. However, the RR algorithm and the PF algorithm only consider scheduling fairness among a plurality of scheduled terminals in one cell, for example, a terminal in a poor channel state also has a scheduling opportunity. Even if these terminals with poor channel quality are scheduled, the video frame correct ratio requirement of the XR service cannot be met. As a result, a user satisfaction rate in the cell is low. In addition, scheduling the terminals with poor channel quality causes a waste of scheduling resources, and system performance deteriorates.

To resolve the foregoing technical problem, embodiments of this application propose that: for a terminal transmitting an XR service, a scheduling priority of the terminal is determined based on an instantaneous rate of the terminal, and a terminal with a high instantaneous rate is preferentially scheduled to transmit the XR service, to maximize a quantity of correctly transmitted video frames of the XR service of the terminal, and meet a video frame correct ratio requirement of the XR service.

It should be noted that with evolution of a communication system and emergence of a new service scenario, the technical solutions provided in embodiments of this application are also applicable to similar technical problems. For example, for another service other than the XR service that has a high requirement on the video frame correct ratio, a scheduling priority of a terminal may also be determined based on an instantaneous rate of the terminal.

With reference to the accompanying drawings in this specification, the following describes the scheduling transmission method provided in embodiments of this application by using an example in which a video frame correct ratio requirement of a service (for example, a first service) that has a high video frame correct ratio requirement is met. It should be noted that communication systems and service scenarios described in embodiments of this application are intended to describe the technical solutions in embodiments of this application more clearly, and do not constitute a limitation on the technical solutions provided in embodiments of this application.

Figure 2:
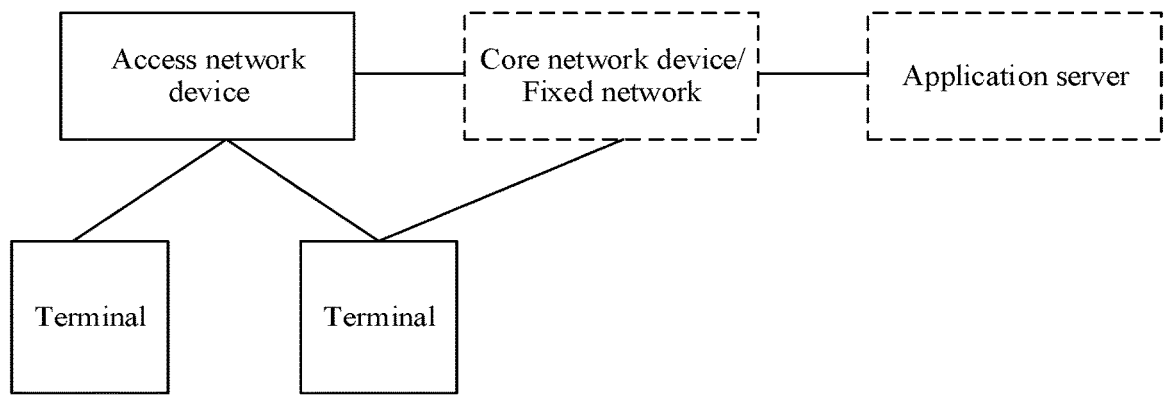
FIG. 2 is a simplified schematic diagram of a communication system according to an embodiment of this application.

The scheduling transmission method provided in this embodiment of this application may be applied to a communication system shown in FIG. 2. As shown in FIG. 2, the communication system may include one or more terminals and an access network device. Further, the communication system may further include an application server (app server, AS), a core network device/fixed network, and the like. The application server or another terminal may perform data transmission with the terminal by using the access network device/fixed network. The one or more terminals are located in a cell covered by the access network device, and the one or more terminals may be terminals to be scheduled by the access network device. It should be noted that scheduling described in this embodiment of this application may include uplink scheduling or downlink scheduling. The uplink scheduling may mean that the access network device schedules the terminal to send uplink data to the application server/another terminal, and the downlink scheduling may mean that the access network device schedules, to the terminal, downlink data sent by the application server/another terminal.

The following describes network elements in the communication system shown in FIG. 2.

The access network device is mainly configured to implement functions such as resource scheduling, radio resource management, and radio access control of the terminal. For example, the access network device may be configured to: determine a scheduling priority of the terminal based on an instantaneous rate of the terminal and a type of a first service of the terminal, and transmit the first service with the terminal based on the scheduling priority of the terminal. Specifically, the access network device may be any node of a small base station, a wireless access point, a transmission reception point (transmission reception point, TRP), a transmission point (transmission point, TP), and another access node. The access network device may be any device that has a wireless transceiver function. The access network device may include but is not limited to: an evolved access network device (evolved NodeB, NodeB, eNB, or e-NodeB) in long term evolution (long term evolution, LTE), an access network device (gNodeB or gNB) or a transceiver point in new radio (new radio, NR), a subsequent evolved access network device in the 3rd generation partnership project (3rd generation partnership project, 3GPP), a wireless fidelity (wireless fidelity, Wi-Fi) access point in a Wi-Fi system, a wireless relay node, a wireless backhaul node, and the like.

The terminal is a device with a wireless transmitting/receiving function. The terminal may be deployed on land, indoor or outdoor, or may be hand-held, wearable or vehicle-mounted; may be deployed on a water surface (for example, on a ship); or may be deployed in the air (for example, on an airplane, a balloon, or a satellite). The terminal may be a mobile phone (mobile phone), a tablet computer (Pad), a computer with a wireless transceiver function, a VR device, an AR device, XR glasses, a television, a smart screen/electronic tablet, a wireless terminal in industrial control (industrial control), an in-vehicle terminal device, a wireless terminal in self driving (self driving), a wireless terminal in remote medical (remote medical), a wireless terminal in smart grid (smart grid), a wireless terminal in transportation safety (transportation safety), a wireless terminal in a smart city (smart city), a wireless terminal in smart home (smart home), a wearable terminal device, and the like. An application scenario is not limited in embodiments of this application. The terminal sometimes may also be referred to as a terminal device, user equipment (user equipment, UE), an access terminal device, a vehicle-mounted terminal, an industrial control terminal, a UE unit, a UE station, a mobile station, a remote station, a remote terminal device, a mobile device, a UE device, a terminal device, a wireless communication device, a UE agent, a UE apparatus, or the like. The terminal may be fixed or movable.

The application server is mainly configured to provide a service for the terminal, for example, provide an XR service. The application server may alternatively be replaced with an application function (application function, AF) or another name, which is not limited.

The core network device may be configured to complete functions such as registration, connection, and session management. The core network device may include a user plane function (user plane function, UPF), a session management network element (for example, a session management function (session management function, SMF)), a mobility management network element (for example, an access and mobility management function (access and mobility management function, AMF)), and the like.

The fixed network may be configured to implement functions such as connection and data transmission. The fixed network may be a Wi-Fi network, an Ethernet, or the like.

It should be noted that FIG. 2 is merely an example diagram of the architecture. In addition to the functional units shown in FIG. 2, the system may further include another functional network element, for example, an operation and management (operation and management, O&M) network element. This is not limited in this embodiment of this application. In addition, names of the devices in FIG. 2 are not limited. In addition to the names shown in FIG. 2, the devices may also have other names. For example, the names may be replaced with names of network elements having same or similar functions. This is not limited.

The communication system shown in FIG. 2 may be a 3GPP communication system, for example, a 4th generation (4th generation, 4G) communication system or an LTE system, or may be a 5th generation (5th generation, 5G) communication system or an NR system, a new radio-vehicle-to-everything (new radio-vehicle-to-everything, NR-V2X) system, an Internet of Things system, or another next generation communication system, or may be a non-3GPP communication system, for example, a Wi-Fi system, or a hybrid networking system of a Wi-Fi system and the foregoing network system. This is not limited.

Figure 3A:
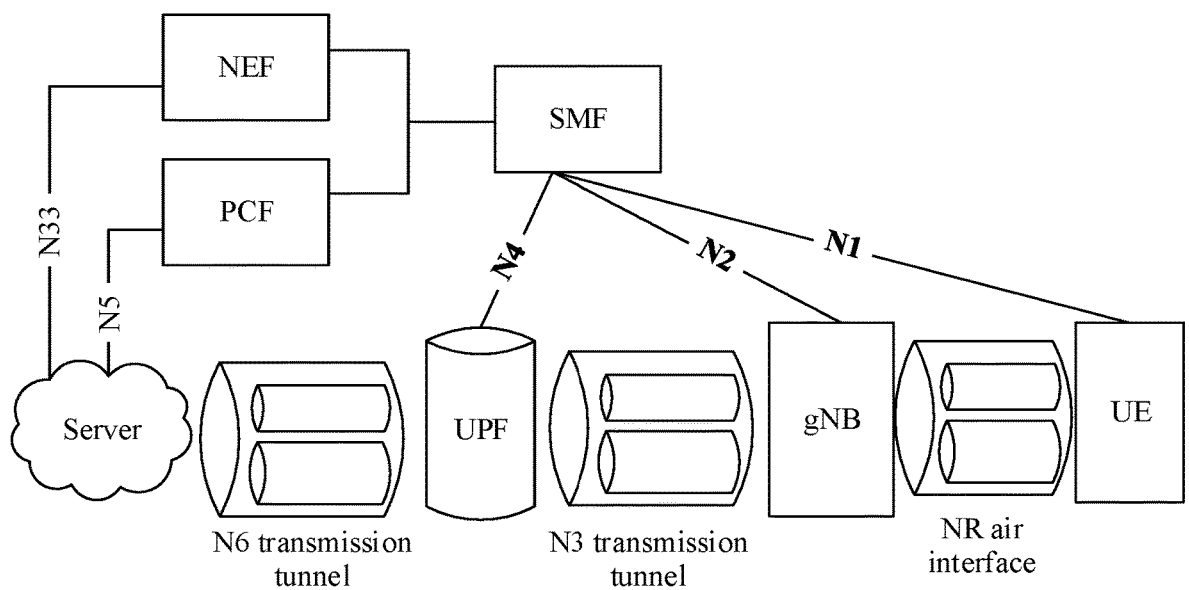
FIG. 3a to FIG. 3d are a simplified schematic diagram of a communication system according to an embodiment of this application.

For example, the communication system shown in FIG. 2 is a 5G communication system. As shown in FIG. 3a, a network element or entity corresponding to the application server in FIG. 2 may be a server in the 5G communication system, the core network device in FIG. 2 may correspond to a network exposure function (network exposure function, NEF), a policy control function (policy control function, PCF), a UPF, an SMF, or the like in the 5G communication system, a network element or entity corresponding to the access network device in FIG. 2 may be a gNB in the 5G communication system, and a network element or an entity corresponding to the terminal may be UE in the 5G communication system. In the 5G communication system, a network element may be connected to a network element by using a next generation (next generation, NG) interface (or an N interface for short). The server may send downlink data to the gNB by using an N6 transmission tunnel between the server and the UPF and an N3 transmission tunnel between the UPF and the gNB. The gNB sends the downlink data to the UE by using an NR air interface.

Figure 3B:
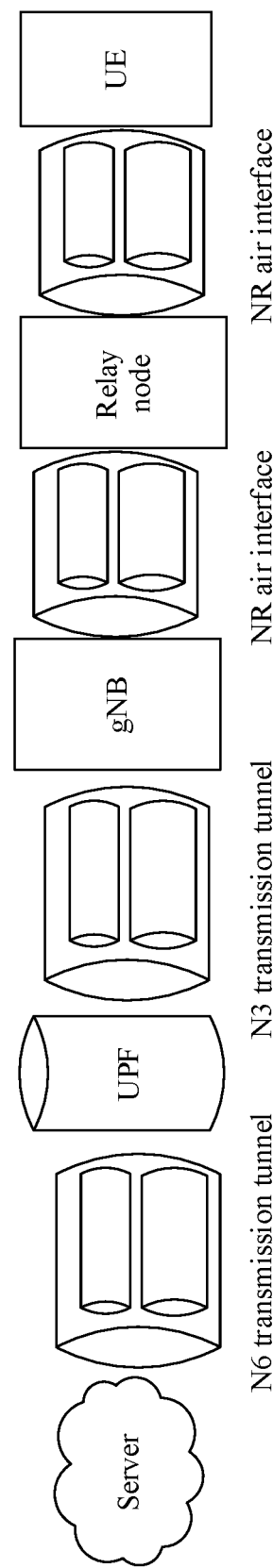

In a possible design, the gNB may directly send the downlink data to the UE through the NR air interface. In another possible design, the gNB may send the downlink data to the UE through a trunk link. For example, FIG. 3b is a schematic diagram of another 5G communication system. As shown in FIG. 3b, a difference between the 5G communication system and the communication system shown in FIG. 3a lies in that there is one or more relay nodes (one relay node in FIG. 3b is used as an example for description) between a gNB and UE, and the gNB and the UE may transmit data by using the one or more relay nodes. The relay (relay) node may be a small cell similar to an NR base station (gNodeB), for example, an integrated access and backhaul (integrated access and backhaul, IAB) base station or a device such as a terminal user or terminal head mounted display XR glasses.

Figure 3C:
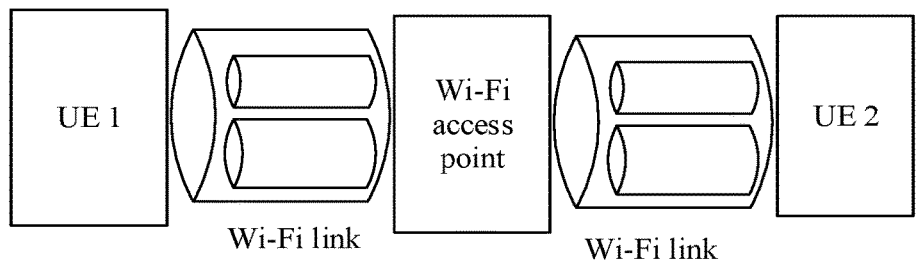

For example, the communication system shown in FIG. 2 is a Wi-Fi system. FIG. 3c is a schematic diagram of the Wi-Fi system. As shown in FIG. 3c, the Wi-Fi system may include UE1, UE2, and a Wi-Fi access point. A network element or entity corresponding to the access network device in FIG. 2 may be a Wi-Fi access point in the Wi-Fi system, and a network element or entity corresponding to the terminal in FIG. 2 may be UE in the Wi-Fi system. As shown in FIG. 3c, UE1 and UE2 may transmit data to each other by using the Wi-Fi access point. The Wi-Fi access point may be a Wi-Fi router or a set-top box. For example, the UE1 is a mobile phone, and the UE2 is a television or a smart screen/electronic tablet. The mobile phone may project an image to the television or the smart screen/electronic tablet by using the Wi-Fi router or the set-top box.

Figure 3D:
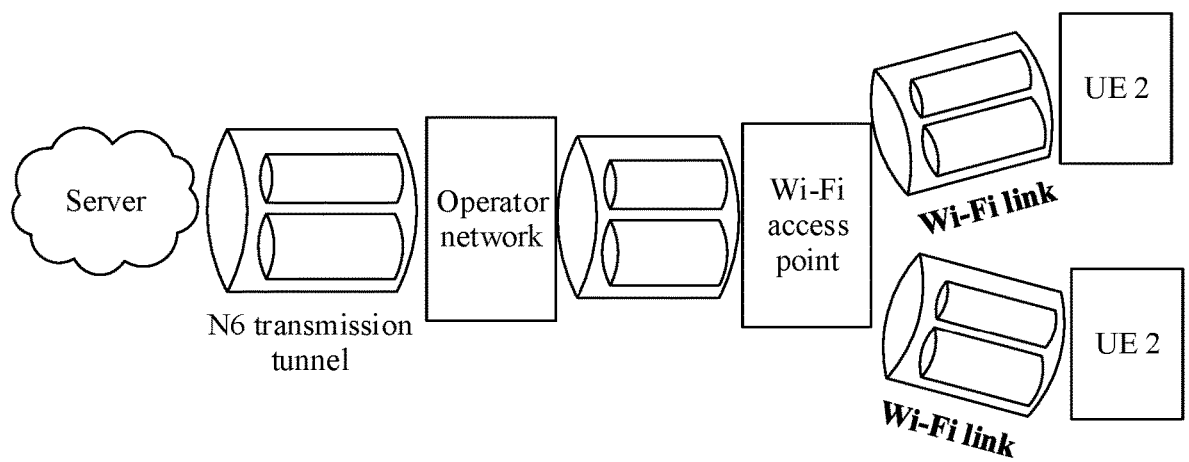

For example, the communication system shown in FIG. 2 is a hybrid networking system. FIG. 3d is a schematic diagram of the hybrid networking system. As shown in FIG. 3d, the system may include a server, an operator network, a Wi-Fi access point, and one or more UEs. A network element or entity corresponding to the application server in FIG. 2 may be the server in the system, a network element or entity corresponding to the access network device in FIG. 2 may be the Wi-Fi access point in the system, and a network element or entity corresponding to the terminal in FIG. 2 may be the UE in the system. The server may send XR service data to the Wi-Fi access point by using the operator network, and the Wi-Fi access point transmits the data to the UE 1 (for example, an XR device) and projects the data to the UE 2 (for example, a television, a smart screen, or an electronic tablet).

Figure 4:
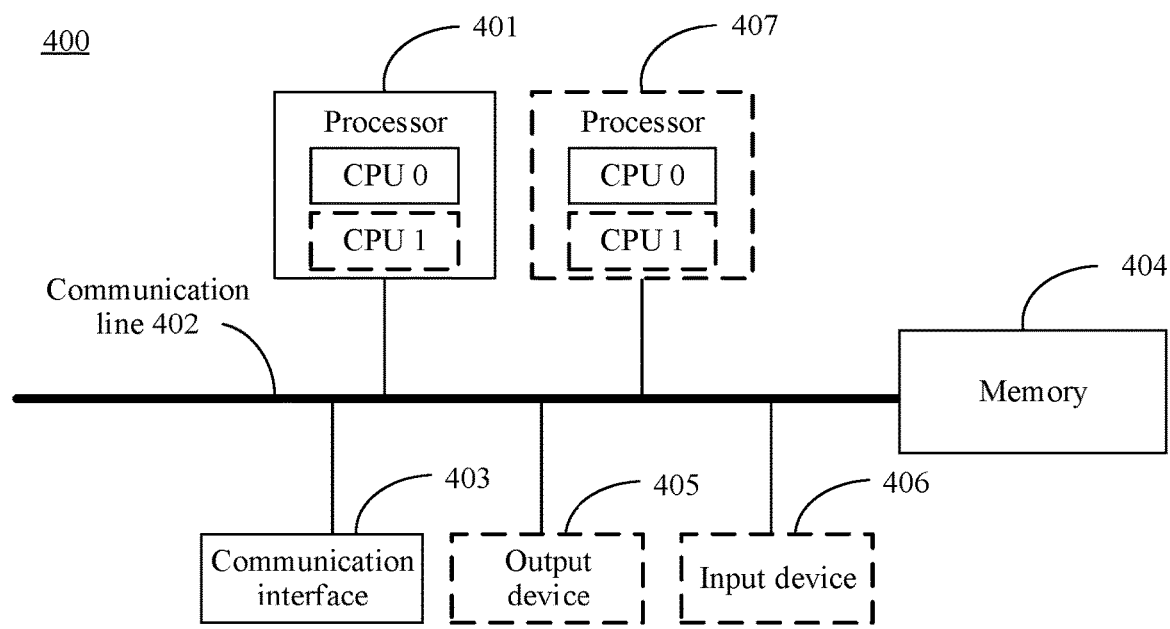
FIG. 4 is a schematic diagram of a communication apparatus according to an embodiment of this application.

During specific implementation, the network elements shown in FIG. 2, for example, the terminal and the access network device, may use a composition structure shown in FIG. 4 or include components shown in FIG. 4. FIG. 4 is a schematic composition diagram of a communication apparatus 400 according to an embodiment of this application. When the communication apparatus 400 has a function of the access network device in this embodiment of this application, the communication apparatus 400 may be the access network device or a chip or a system-on-chip in the access network device.

As shown in FIG. 4, the communication apparatus 400 may include a processor 401, a communication line 402, and a communication interface 403. Further, the communication apparatus 400 may include a memory 404. The processor 401, the memory 404, and the communication interface 403 may be connected to each other through the communication line 402.

The processor 401 may be a central processing unit (central processing unit, CPU), a general-purpose network processor (network processor, NP), a digital signal processor (digital signal processor, DSP), a microprocessor, a microcontroller, a programmable logic device (programmable logic device, PLD), or any combination thereof. The processor 401 may alternatively be any other apparatus having a processing function, for example, a circuit, a component, or a software module.

The communication line 402 is configured to transmit information between the components included in the communication apparatus 400.

The communication interface 403 is configured to communicate with another device or another communication network. The another communication network may be an Ethernet, a radio access network (radio access network, RAN), a wireless local area network (wireless local area network, WLAN), or the like. The communication interface 403 may be a radio frequency module, a transceiver, or any apparatus that can implement communication. In this embodiment of this application, an example in which the communication interface 403 is a radio frequency module is used for description. The radio frequency module may include an antenna, a radio frequency circuit, and the like. The radio frequency circuit may include an integrated radio frequency chip, a power amplifier, and the like.

The memory 404 is configured to store instructions. The instructions may be a computer program.

The memory 404 may be a read-only memory (read-only memory, ROM) or another type of static storage device that can store static information and/or instructions, or may be a random access memory (random access memory, RAM) or another type of dynamic storage device that can store information and/or instructions, or may be an electrically erasable programmable read-only memory (electrically erasable programmable read-only memory, EEPROM), a compact disc read-only memory (compact disc read-only memory, CD-ROM) or other optical disk storage, optical disc storage, or a magnetic disk storage medium or another magnetic storage device. The optical disc storage includes a compact disc, a laser disc, an optical disc, a digital versatile disc, a Blu-ray disc, and the like.

It should be noted that the memory 404 may exist independently of the processor 401, or may be integrated into the processor 401. The memory 404 may be configured to store instructions, program code, some data, or the like. The memory 404 may be located inside the communication apparatus 400, or may be located outside the communication apparatus 400. This is not limited. The processor 401 is configured to execute the instructions stored in the memory 404, to implement the scheduling transmission method provided in the following embodiments of this application.

In an example, the processor 401 may include one or more CPUs, for example, CPU 0 and CPU 1 in FIG. 4.

In an optional implementation, the communication apparatus 400 includes a plurality of processors. For example, the communication apparatus 400 may further include a processor 407 in addition to the processor 401 in FIG. 4.

In an optional implementation, the communication apparatus 400 further includes an output device 405 and an input device 406. The input device 406 is a keyboard, a mouse, a microphone, a joystick, or the like, and the output device 405 is a display, a speaker (speaker), or the like.

It should be noted that the communication apparatus 400 may be a desktop computer, a portable computer, a network server, a mobile phone, a tablet computer, a wireless terminal, an embedded device, a chip system, or a device having a structure similar to that in FIG. 4. In addition, the composition structure shown in FIG. 4 does not constitute a limitation on the communication apparatus. In addition to the components shown in FIG. 4, the communication apparatus may include more or fewer components than those shown in the figure, or some components may be combined, or different component arrangements may be used.

In this embodiment of this application, the chip system may include a chip, or may include a chip and another discrete component.

The following describes the scheduling transmission method provided in embodiments of this application with reference to the communication system shown in FIG. 2. Devices in the following embodiments may have the components shown in FIG. 4, and actions, terms, and the like in embodiments of this application may be mutually referenced. In embodiments, names of messages exchanged between devices, names of parameters in the messages, or the like are merely examples, and may alternatively be other names during specific implementation. This is not limited.

Figure 5:
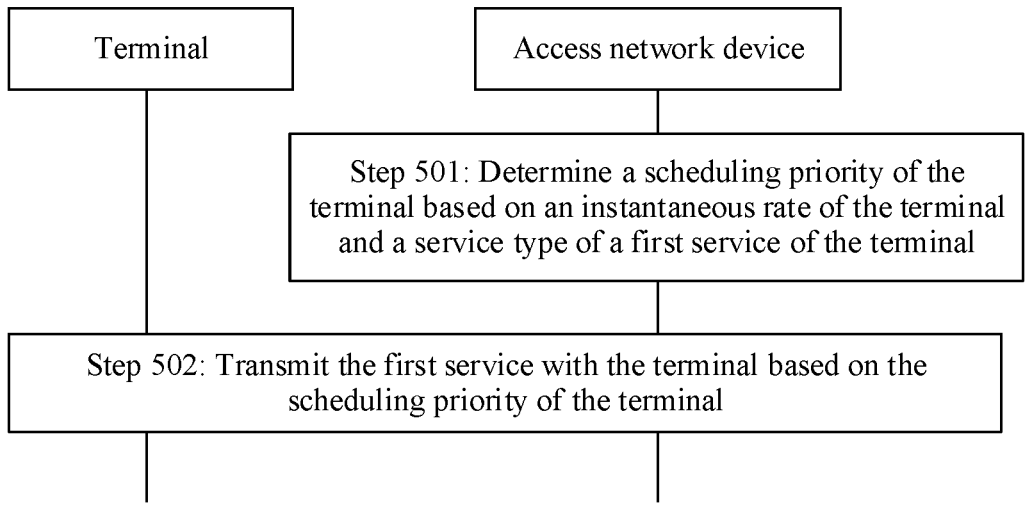
FIG. 5 is a flowchart of a scheduling transmission method according to an embodiment of this application.

FIG. 5 shows a scheduling transmission method according to an embodiment of this application. As shown in FIG. 5, the method may include the following steps.

Step 501: An access network device determines a scheduling priority of a terminal based on an instantaneous rate of the terminal and a service type of a first service of the terminal.

The access network device may be the access network device in FIG. 2, the terminal may be any terminal that is in the communication system shown in FIG. 2 and that is connected to the access network device, and the terminal may be located in a multicast group.

The instantaneous rate of the terminal is described in the foregoing formula (1). In a unicast transmission mode, that is, the access network device performs one-to-one transmission with the terminal, the instantaneous rate of the terminal may be obtained through calculation based on a current channel state parameter (such as CSI or RI) of the terminal. A current channel state of the terminal is positively correlated with an instantaneous rate of the terminal. For example, a better channel state of the terminal indicates a higher instantaneous rate of the terminal, and a poorer channel state of the terminal indicates a lower instantaneous rate of the terminal. In a multicast transmission mode, that is, in a scenario in which the terminal is located in the multicast group and the access network device transmits a service to the multicast group, the instantaneous rate of the terminal may be an instantaneous rate of a terminal with a worst channel state in the multicast group. In a scenario in which a service is transmitted in a relay manner shown in FIG. 3*b*, the instantaneous rate of the terminal may be an instantaneous rate of a link with a worst channel state in a multi-hop link from the access network device to the terminal.

Based on a transmission direction, the first service of the terminal may be a downlink service delivered by the application server/another terminal to the terminal by using a core network device (such as a UPF) or the access network device, or the first service of the terminal may be an uplink service sent by the terminal to the application server/another terminal by using the access network device or a core network device. Based on a service type, the first service may be a service whose target video frame correct ratio is greater than a first threshold. For example, the first service may be an XR service or another service that has a high video frame correct ratio requirement.

The target video frame correct ratio of the first service may be used to represent a requirement of most users on a video frame correct ratio of the first service. For example, an XR service of the first service is used as an example. In a single-stream transmission mode, the target video frame correct ratio of the first service is 99%. In a multi-stream transmission mode, a video frame correct ratio corresponding to a BL data packet of the first service is 99.99%, and a target video frame correct ratio corresponding to an EL data packet of the first service is 50%. The target video frame correct ratio of the first service may be preset or specified in a protocol. For example, a target video frame correct ratio required by a user may be preset in a user-level evaluation indicator corresponding to the first service.

The first threshold may be set as required. This is not limited. If the target video frame correct ratio of the first service is greater than the first threshold, it indicates that the user has a high requirement on the video frame correct ratio of the first service. If the target video frame correct ratio of the first service is less than or equal to the first threshold, it indicates that the user has a low requirement on the video frame correct ratio of the first service.

The scheduling priority of the terminal may be used to represent a sequence/time of scheduling the terminal in a plurality of terminals that are to be scheduled by the access network device and that occupy a same transmission resource. The scheduling priority of the terminal is positively correlated with the sequence/time of scheduling the terminal. A higher scheduling priority of the terminal indicates that the terminal is scheduled earlier, and a lower scheduling priority of the terminal indicates that the terminal is scheduled later. For example, there are two terminals to be scheduled by a base station 1, namely, a terminal 1 and a terminal 2. If a scheduling priority of the terminal 1 is higher than a scheduling priority of the terminal 2, the terminal 1 is scheduled at a time point 1, and the terminal 2 is scheduled at a time point 2, where the time point 1 is earlier than the time point 2.

For example, that the access network device determines the scheduling priority of the terminal based on the instantaneous rate of the terminal and the service type of the first service of the terminal may include: The access network device determines the service type of the first service of the terminal, and if the access network device determines that the first service of the terminal is a service whose target video frame correct ratio is greater than the first threshold, the access network device determines the scheduling priority of the terminal based on the instantaneous rate of the terminal.

In this embodiment of this application, the instantaneous rate of the terminal is positively correlated with the scheduling priority of the terminal. A higher instantaneous rate of the terminal indicates a higher scheduling priority of the terminal, and a lower instantaneous rate of the terminal indicates a lower scheduling priority of the terminal. In this way, a terminal with a good channel state and a high instantaneous rate is preferentially scheduled, to ensure that most video frames of a first service of the terminal are correctly transmitted, and improve a video frame correct ratio of the first service.

In a possible implementation, the instantaneous rate of the terminal and the scheduling priority of the terminal may satisfy the following formula (2):

Scheduling priority of a terminal=$M_1$(instantaneous rate)   Formula (2)

An implementation form of the function $M_1$ is not limited in his embodiment of this application, and $M_1$ may be a monotonically increasing linear function or an exponential function, for example, $M_1(x)=2x$, where x is an input parameter of the function $M_1$, for example, x may be the instantaneous rate of the terminal. The algorithm shown in the formula (2) may be referred to as a maximum carrier-interference ratio (maximum carrier-interference ratio, MAX C/I) scheduling algorithm.

In addition to determining the scheduling priority of the terminal based on the instantaneous rate of the terminal, the scheduling priority of the terminal may be determined in the MAX C/I scheduling algorithm with reference to another parameter. For example, the scheduling priority of the terminal may be determined based on the instantaneous rate of the terminal and a first parameter, where the first parameter may indicate a first video frame correct ratio of the first service.

In a possible design, the first parameter may include the first video frame correct ratio of the first service. In still another possible design, the first parameter may include a video frame error ratio of the first service of the terminal.

The first video frame correct ratio of the first service may refer to a ratio of a quantity of correctly transmitted video frames of the first service in a time period (for example, a time period before a current moment) to a total quantity of transmitted video frames of the first service in the time period. The video frame error ratio of the first service may refer to a ratio of a quantity of incorrectly transmitted video frames of the first service in the time period to a total quantity of transmitted video frames of the first service in the time period. The first video frame correct ratio of the first service and the video frame error ratio of the first service satisfy the following relationship: the first video frame correct ratio of the first service=1−the video frame error ratio of the first service. That is, the video frame error ratio of the first service may be obtained through calculation based on the first video frame correct ratio of the first service, or the first video frame correct ratio of the first service may be obtained through calculation based on the video frame error ratio of the first service.

In this embodiment of this application, a correspondence between the first video frame correct ratio of the first service and the scheduling priority of the terminal may be as follows: When the first video frame correct ratio of the first service is less than the target video frame correct ratio of the first service, the first video frame correct ratio of the first service is positively correlated with the scheduling priority of the terminal. In other words, a closer video frame correct ratio to the target video frame correct ratio indicates a higher scheduling priority of the terminal. When the first video frame correct ratio of the first service is greater than the target video frame correct ratio of the first service, the first video frame correct ratio of the first service is negatively correlated with the scheduling priority of the terminal, or the scheduling priority of the terminal remains unchanged.

In this way, a higher scheduling priority may be assigned to a terminal whose video frame correct ratio is closer to the target video frame correct ratio, and a scheduling priority of a terminal whose video frame correct ratio exceeds the target video frame correct ratio is slightly reduced, so that more terminals can meet a requirement of the target video frame correct ratio.

Figure 8A:
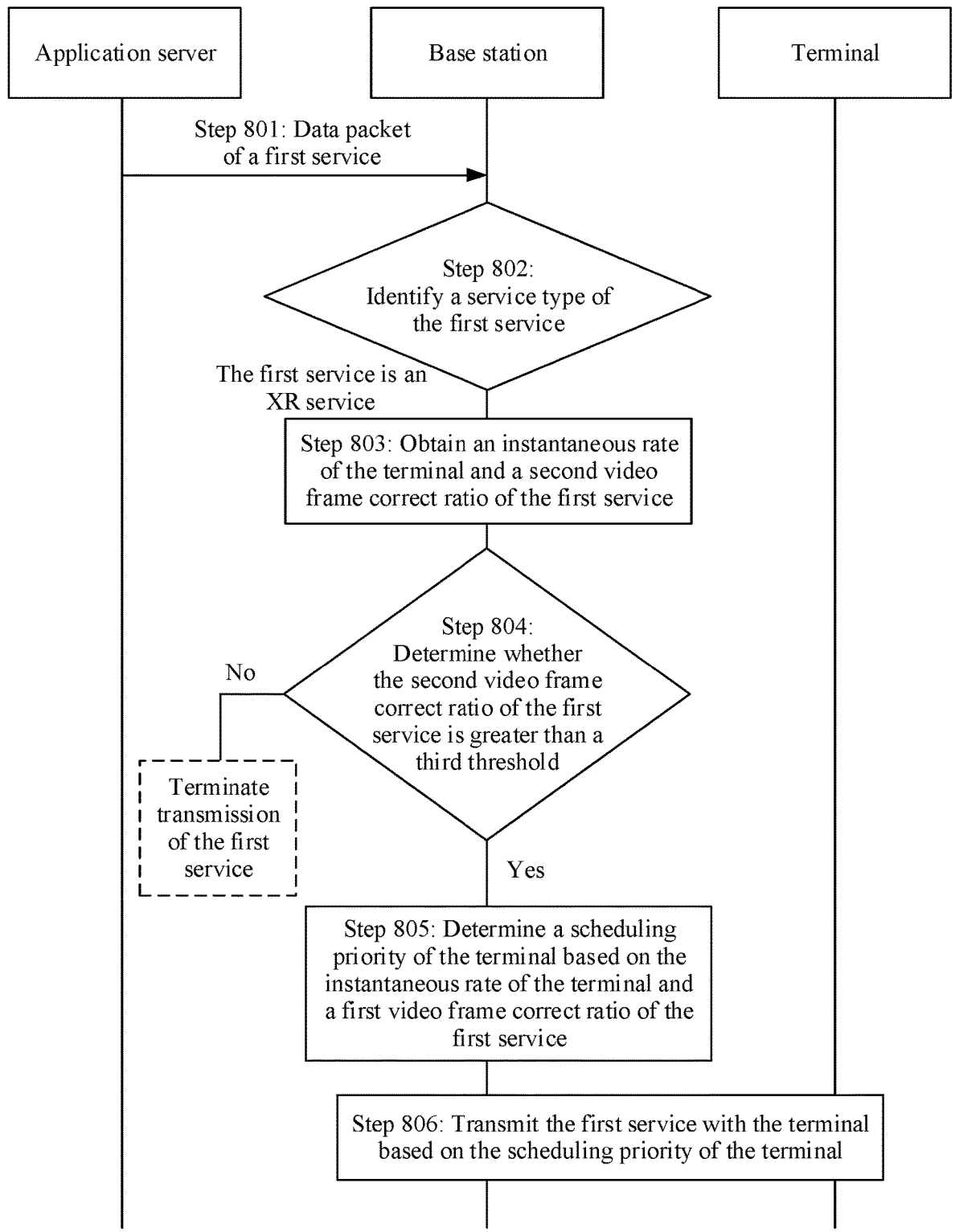
FIG. 8A is a flowchart of still another scheduling transmission method according to an embodiment of this application.
Figure 10A:
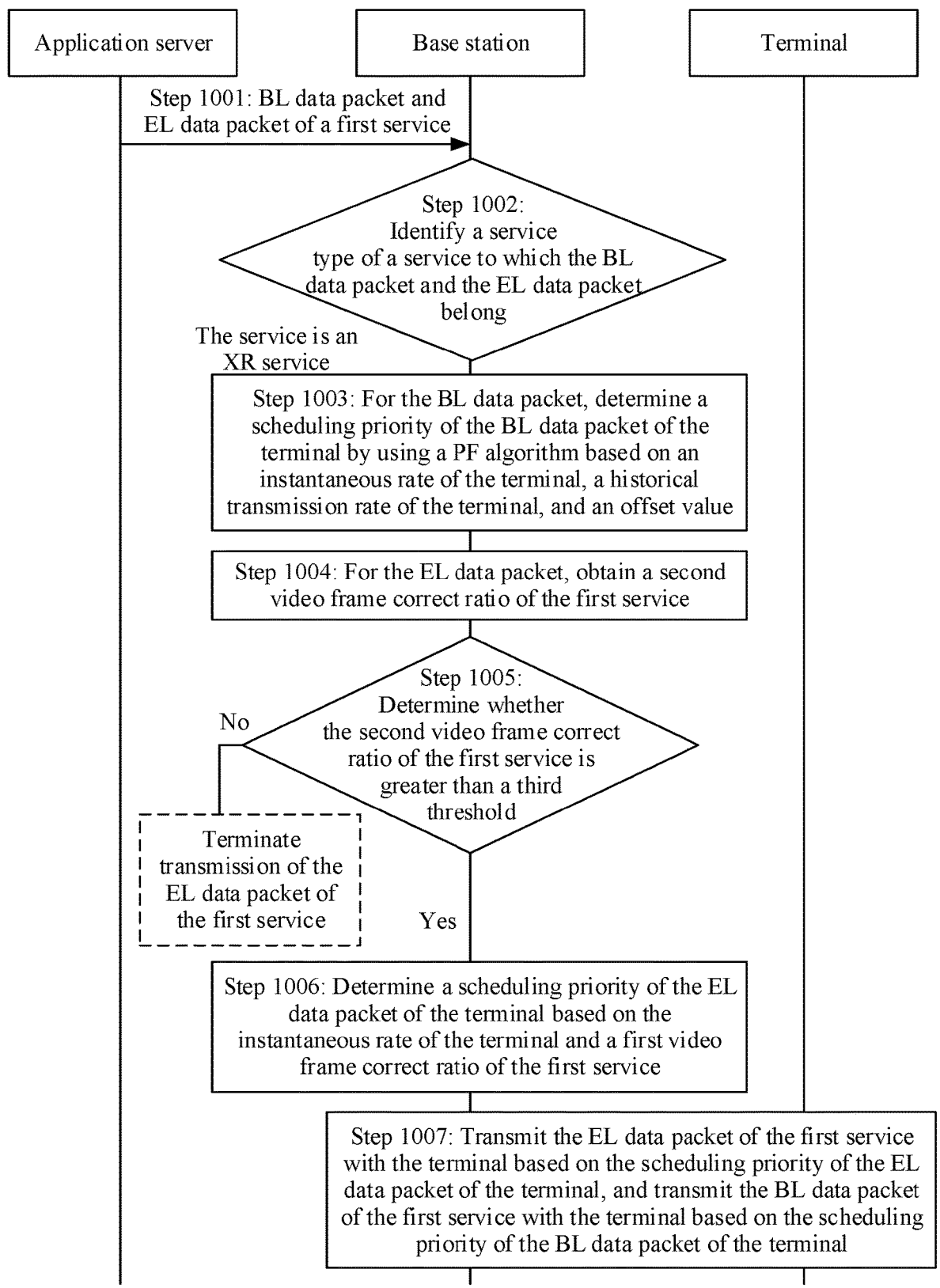
FIG. 10A is a flowchart of yet still another scheduling transmission method according to an embodiment of this application.

Specifically, for determining the scheduling priority of the terminal based on the instantaneous rate of the terminal and the first parameter, refer to step 805 in FIG. 8A or step 1006 in FIG. 10A.

Step 502: The access network device transmits the first service with the terminal based on the scheduling priority of the terminal.

For example, if the first service is a downlink service sent by the application server/another terminal to the terminal, that the access network device transmits the first service with the terminal based on the scheduling priority of the terminal may include: The access network device sends downlink scheduling information and a data packet of the first service to the terminal based on the scheduling priority of the terminal, where the downlink scheduling information is used to schedule the data packet of the first service sent to the terminal.

If the first service is an uplink service sent by the terminal to the application server or another terminal, that the access network device transmits the first service with the terminal based on the scheduling priority of the terminal may include: The access network device sends uplink scheduling information to the terminal based on the scheduling priority of the terminal, receives a data packet of the first service from the terminal based on the uplink scheduling information, and sends the data packet of the first service to the application server/the another terminal, where the uplink scheduling information is used to schedule the data packet of the first service sent by the terminal.

It should be noted that the method shown in FIG. 5 may be applicable to the single-stream transmission mode, and may be applicable to the multi-stream transmission mode. In the multi-stream transmission mode, the data packet of the first service in the method shown in FIG. 5 may be the EL data packet of the first service, the video frame correct ratio of the first service may be an EL frame correct ratio of the first service, and the video frame error ratio of the first service may be an EL frame error ratio of the first service. Further, in the multi-stream transmission mode, a scheduling priority of the BL data packet of the terminal may be determined. Specifically, for a process in which the access network device determines the scheduling priority of the BL data packet, refer to step 903 in FIG. 9 or step 1003 in FIG. 10A.

Based on the method shown in FIG. 5, in a scenario in which the first service whose target video frame correct ratio is greater than the first threshold is transmitted with the terminal, the scheduling priority of the terminal may be determined with reference to the instantaneous rate of the terminal. In this way, a terminal with a high instantaneous rate is preferentially scheduled to transmit the first service, and a quantity of correctly transmitted video frames of the first service is maximized, to reach the target video frame correct ratio of the first service, and meet a transmission requirement of the first service.

In an implementation scenario of the method shown in FIG. 5, before performing step 501, the access network device may further determine whether a video frame correct ratio in a process of transmitting the first service by the terminal is high. If the video frame correct ratio is high, the terminal is scheduled; otherwise, transmission of the first service of the terminal is terminated. That is, a terminal with a low video frame correct ratio is not scheduled, to improve resource utilization. Specifically, the method may include the following steps.

Before step 501 is performed, the access network device determines whether a second video frame correct ratio of the first service of the terminal is greater than a third threshold. If the second video frame correct ratio of the first service of the terminal is greater than the third threshold, it indicates that the video frame correct ratio of the terminal is high, and step 501 is performed to determine the scheduling priority of the terminal.

On the contrary, if the second video frame correct ratio of the first service of the terminal is less than or equal to the third threshold, it indicates that the video frame correct ratio of the terminal is low/poor. Even if the terminal is scheduled, the video frame correct ratio of the terminal cannot meet a requirement. Consequently, a scheduling resource is wasted, and system performance deteriorates. Therefore, transmission of the first service is terminated.

The third threshold may be set as required. This is not limited.

Figure 6A:
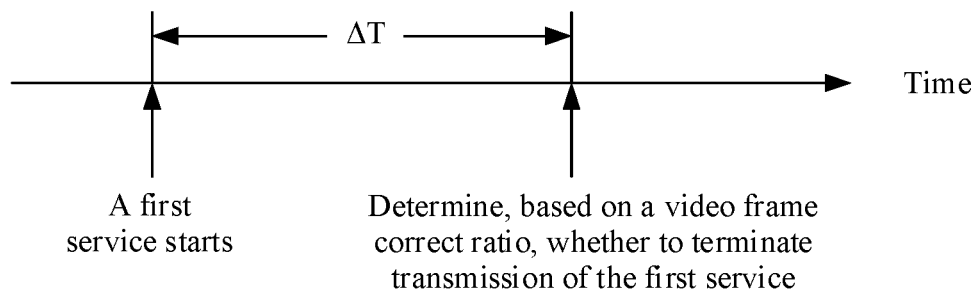
FIG. 6a is a schematic diagram of terminating service transmission of a terminal of a video frame correct ratio according to an embodiment of this application.

For example, as shown in FIG. 6a, the access network device may collect statistics about a video frame correct ratio in a time period (as shown in FIG. 6a) after the first service starts, and use the video frame correct ratio in the time period as the second video frame correct ratio to compare with the third threshold. If the video frame correct ratio is less than the third threshold, transmission of the first service is terminated; otherwise, the method shown in FIG. 5 is performed.

Figure 6B:
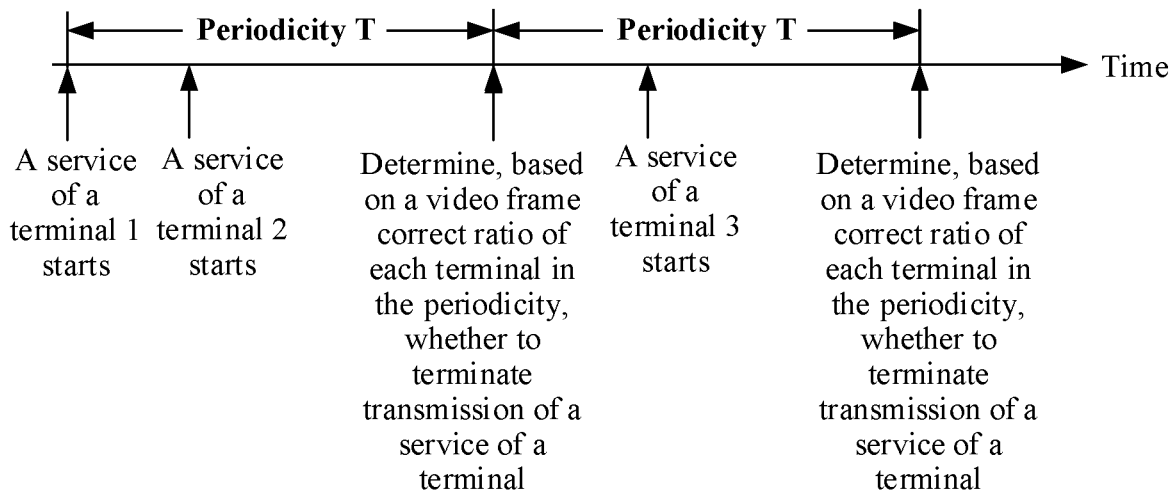
FIG. 6b is another schematic diagram of terminating service transmission of a terminal of a video frame correct ratio according to an embodiment of this application.

For another example, as shown in FIG. 6b, the access network device may periodically collect statistics about a video frame correct ratio of a service corresponding to each of a plurality of to-be-scheduled terminals in a cell. If within a current periodicity, the video frame correct ratio of the first service of the to-be-scheduled terminal is less than the third threshold, transmission of the first service of the terminal is terminated. Otherwise, if the video frame correct ratio of the first service of the terminal is greater than the third threshold, the method shown in FIG. 5 is performed.

Further, in time period after step 502 is performed, the access network device may transmit the first service with the terminal based on the determined scheduling priority of the terminal, or the access network device may determine whether a video frame correct ratio in a process of transmitting the first service by the terminal is high, for example, whether the video frame correct ratio is greater than the third threshold. If the video frame correct ratio is greater than the third threshold, the access network device continues to schedule the terminal based on the scheduling priority determined in step 501, or re-determines the scheduling priority of the terminal, and transmits the first service with the terminal based on the new scheduling priority. Otherwise, transmission of the first service of the terminal is terminated, that is, a terminal with a low video frame correct ratio is not scheduled, to improve resource utilization.

In this embodiment of this application, the following manner 1 or manner 2 may be used to determine the video frame correct ratio of the first service, for example, determine the first video frame correct ratio of the first service or the second video frame correct ratio of the first service. It should be understood that, as described above, the first video frame correct ratio of the first service=(1−the video frame error ratio of the first service). Therefore, the video frame error ratio of the first service of the terminal may also be determined according to the following manner 1 or manner 2. For example, in manner 1 or manner 2, after obtaining the video frame correct ratio of the first service of the terminal, the access network device may further calculate (1−the video frame error ratio of the first service) to obtain the video frame error ratio of the first service of the terminal.

Manner 1: The access network device determines the video frame correct ratio of the first service based on packet error information of the data packet corresponding to the video frame of the first service. Specifically, the manner 1 may include the following manner 1.1 or manner 1.2.

Manner 1.1: The access network device obtains the video frame correct ratio of the first service through calculation based on a quantity of correctly transmitted video frames and a total quantity of video frames of the first service in the video frames of the first service.

For example, the first service is a downlink service sent by the application server to the terminal. Each data packet (for example, an IP packet) corresponding to a video frame of the first service sent by the application server carries first information, and the first information is used to indicate the video frame to which the data packet belongs. After receiving the data packet corresponding to the video frame from the application server, the access network device encapsulates the data packet into a packet data convergence protocol (packet data convergence protocol, PDCP) packet and sends the packet data convergence protocol packet to the terminal. After receiving the PDCP packet, the terminal determines, through parsing processing, whether the PDCP packet is correctly received, and feeds back acknowledgment (acknowledgment, ACK) information/non-acknowledgement (non-acknowledgment, NACK) information corresponding to the PDCP packet to the access network device, where the ACK information indicates that the terminal correctly receives the data packet corresponding to the video frame of the first service, and the NACK information indicates that the terminal fails to receive the data packet corresponding to the video frame of the first service. The access network device collects statistics about ACK information/NACK information corresponding to data packets in a time period, and determines a data packet correctly received by the terminal. In addition, the access network device determines, based on first information carried in the data packet, a video frame to which the data packet belongs. If all data packets belonging to a same video frame are correctly transmitted, it is determined that the video frame is correctly transmitted; or if there is an incorrectly transmitted data packet in data packets belonging to a same video frame, it is determined that the video frame is not correctly transmitted. The access network device obtains, through calculation based on a quantity of correctly transmitted video frames and a total quantity of video frames of the first service, a video frame correct ratio of the first service in the time period.

In a possible implementation, the first information may include/carry a frame identifier (for example, a frame ID) of the video frame corresponding to the data packet, the frame identifier of the video frame may be used to identify the video frame, and the frame identifier of the video frame may be pre-allocated. In this way, the video frame to which the data packet belongs may be learned according to the frame identifier of the video frame carried in the data packet.

In another possible implementation, the first information is irrelevant to a frame identifier of the video frame. For example, data packets of the first service (for example, data packets corresponding to all or some video frames of the first service) may be divided into a plurality of groups (group). Optionally, data packets corresponding to one video frame are divided into one group, and a group identifier (for example, a group ID) is correspondingly configured for each group. First information carried in a data packet in each group may be a group ID corresponding to the group. In this way, a group to which the data packet belongs may be learned according to the group ID carried in the data packet, and further, a video frame to which the data packet belongs may be learned according to a correspondence between the group and the video frame.

Manner 1.2: The access network device uses a packet error ratio of the video frame of the first service as the video frame correct ratio of the first service.

For example, the first service is a downlink service sent by the application server to the terminal. After receiving a data packet corresponding to a video frame from the application server, the access network device encapsulates the data packet into a PDCP packet and sends the PDCP packet to the terminal. After receiving the PDCP packet, the terminal determines, through parsing processing, whether the PDCP packet is correctly received, and feeds back acknowledgment ACK information/non-acknowledgement NACK information corresponding to the PDCP packet to the access network device, where the ACK information indicates that the terminal correctly receives the data packet corresponding to the video frame of the first service, and the NACK information indicates that the terminal fails to receive the data packet corresponding to the video frame of the first service. The access network device collects statistics about a quantity of data packets sent in a time period and ACK information/NACK information corresponding to the data packets, determines a quantity of data packets correctly received by the terminal, calculates a packet error ratio based on the quantity of data packets correctly received by the terminal and a total quantity of sent data packets of the video frames of the first service, and uses the packet error ratio as a video frame correct ratio of the first service in the time period.

Manner 2: The access network device receives second information from the terminal, where the second information is used to indicate the video frame correct ratio of the first service, in other words, the terminal reports the video frame correct ratio of the first service to the access network device. The access network device determines the video frame correct ratio of the first service based on the second information.

Before the access network device receives the second information from the terminal, the access network device may send third information to the terminal. The third information is used to indicate to periodically or non-periodically report the video frame correct ratio of the first service, so that the terminal reports the video frame correct ratio of the first service under indication of the access network device. Further, if the third information is used to indicate to periodically report the video frame correct ratio of the first service, the third information may be further used to indicate a reporting periodicity.

Specifically, design forms of the second information and the third information are shown in manner 2.1, manner 2.2, or manner 2.3.

Manner 2.1: The second information is carried in MAC CE signaling, and the third information is carried in RRC signaling.

For example, in an example in which the second information is used to indicate to periodically report the video frame correct ratio of the first service, the access network device may add a new field to the RRC signaling, for example, a report frame right ratio-timer (report frame right ratio-timer) field. A value corresponding to the field is used to indicate to report the video frame correct ratio of the first service and indicate a reporting periodicity. If there is a correspondence between the value of the field and the reporting periodicity, the access network device sends the RRC signaling to the terminal.

Correspondingly, the terminal receives the RRC signaling, and determines, based on the value corresponding to the report frame right ratio-timer field in the RRC signaling and the correspondence between the value of the field and the reporting periodicity, to periodically report the video frame correct ratio of the first service to the access network device. After receiving the data packet corresponding to the video frame of the first service, an application layer of the terminal calculates the video frame correct ratio of the first service when a reporting periodicity arrives, and notifies the video frame correct ratio of the first service to a MAC layer of the terminal, and the MAC layer of the terminal reports, based on the video frame correct ratio of the first service, the MAC CE signaling including the second information to the access network device. Further, when a next reporting periodicity arrives, the action is repeated, and the MAC CE including the second information is reported to the access network device again.

For example, the correspondence between the value corresponding to the report frame right ratio-timer field in the RRC signaling and the reporting periodicity is shown in Table 1. The value corresponding to the report frame right ratio-timer field includes two binary bits. For example, binary bits "00" correspond to 5 milliseconds (ms), binary bits "01" correspond to 10 ms, binary bits "10" correspond to 20 ms, and binary bits "11" correspond to 50 ms. If the value corresponding to the report frame right ratio-timer field in the RRC signaling reported by the access network device is 00, after receiving the RRC signaling, the terminal may determine, by querying the following Table 1, to report the video frame correct ratio of the first service to the access network device by using a reporting periodicity of 5 ms.

TABLE 1

| Value corresponding to a report frame right ratio-timer field | Report periodicity |
|---|---|
| 00 | 5 ms |
| 01 | 10 ms |
| 10 | 20 ms |
| 11 | 50 ms |

In this embodiment of this application, that the second information is used to indicate the video frame correct ratio of the first service may include: There is a correspondence between the second information and a video frame correct ratio range in which the video frame correct ratio of the first service is located. The video frame correct ratio range in which the video frame correct ratio of the first service is located may be determined based on the second information, and the video frame correct ratio of the first service is estimated from the video frame correct ratio range. In other words, second information corresponding to video frame correct ratios within a same video frame correct ratio range is the same, that is, the second information may indicate a video frame correct ratio range, to reduce signaling overheads.

For example, the following Table 2 shows the correspondence between the second information, the video frame correct ratio range, and the video frame correct ratio of the first service. After learning the video frame correct ratio of the first service that is obtained by the application layer of the terminal, the MAC layer of the terminal determines, by querying the following Table 2, the video frame correct ratio range corresponding to the video frame correct ratio of the first service, and reports the MAC CE including the second information corresponding to the range to the access network device.

TABLE 2

| Video frame correct ratio range | Second information carried in MAC CE signaling | Video frame correct ratio of a first service |
|---|---|---|
| 0% to 50% | 000 | 40% |
| 50% to 70% | 001 | 60% |
| 70% to 80% | 010 | 75% |

TABLE 2-continued

| Video frame correct ratio range | Second information carried in MAC CE signaling | Video frame correct ratio of a first service |
|---|---|---|
| 80% to 85% | 011 | 82% |
| 85% to 90% | 100 | 87% |
| 90% to 95% | 101 | 93% |
| 95% to 99% | 110 | 97% |
| 99% to 100% | 111 | 99.5% |

Manner 2.2: The second information is carried in MAC CE signaling, and the third information is carried in DCI.

For example, the access network device may add a new field to the DCI, for example, report a ReportFrameRightRatioIndicator "ReportFrameRightRatioIndicator" field. A value corresponding to the field is used to indicate to report the video frame correct ratio of the first service and indicate a scheduled reporting time point. If there is a correspondence between the value of the field and the scheduled reporting time point, the access network device sends, to the terminal, the DCI to which the new field is added.

Correspondingly, the terminal receives the DCI, and determines, based on a value corresponding to the ReportFrameRightRatioIndicator field in the DCI and the correspondence between the value of the field and the scheduled reporting time point, to report the video frame correct ratio of the first service to the access network device after specific duration. After receiving the data packet corresponding to the video frame of the first service, the application layer of the terminal calculates the video frame correct ratio of the first service, and notifies the frame correct ratio of the first service to the MAC layer of the terminal when the scheduled reporting time point arrives. The MAC layer of the terminal reports, based on the video frame correct ratio of the first service, the MAC CE signaling including the second information to the access network device.

For example, the correspondence between the value corresponding to the ReportFrameRightRatioIndicator field in the DCI and the scheduled reporting time point is shown in the following Table 3. The value corresponding to the ReportFrameRightRatioIndicator field includes two binary bits. For example, binary bits "00" correspond to none (None), binary bits "01" correspond to five scheduling timeslots, binary bits "10" correspond to 10 scheduling timeslots, and binary bits "11" correspond to 15 scheduling timeslots. If the value corresponding to the ReportFrameRightRatioIndicator field in the DCI reported by the access network device is 11, after receiving the RRC signaling, the terminal may determine, by querying the following Table 3, to report the video frame correct ratio of the first service to the access network device after 15 scheduling timeslots. It should be noted that duration of the scheduling timeslot may be set according to a requirement, and is not limited.

TABLE 3

| Value corresponding to a ReportFrameRightRatioIndicator field | Scheduled reporting time point |
|---|---|
| 00 | None |
| 01 | Five scheduling timeslots |
| 10 | 10 scheduling timeslots |
| 11 | 15 scheduling timeslots |

Manner 2.3: The second information is carried in RRC signaling, and the third information is carried in the RRC signaling.

For related descriptions of the third information in manner 2.3, refer to the foregoing manner 2.1 or manner 2.2. Details are not described again.

Different from manner 2.1 or manner 2.2, in manner 2.3, after receiving the data packet corresponding to the video frame of the first service, the application layer of the terminal calculates the video frame correct ratio of the first service. When the reporting periodicity or the scheduled reporting time point arrives, an RRC layer of the terminal reports, based on the video frame correct ratio of the first service, the RRC signaling including the second information to the access network device.

In manner 2, after receiving the data packet corresponding to the video frame of the first service, the application layer of the terminal may calculate the video frame correct ratio of the first service with reference to the conventional technology. For example, the application layer of the terminal may calculate the video frame correct ratio of the first service based on a quantity of correctly transmitted video frames in the video frames of the first service and a total quantity of video frames of the first service.

Figure 7:
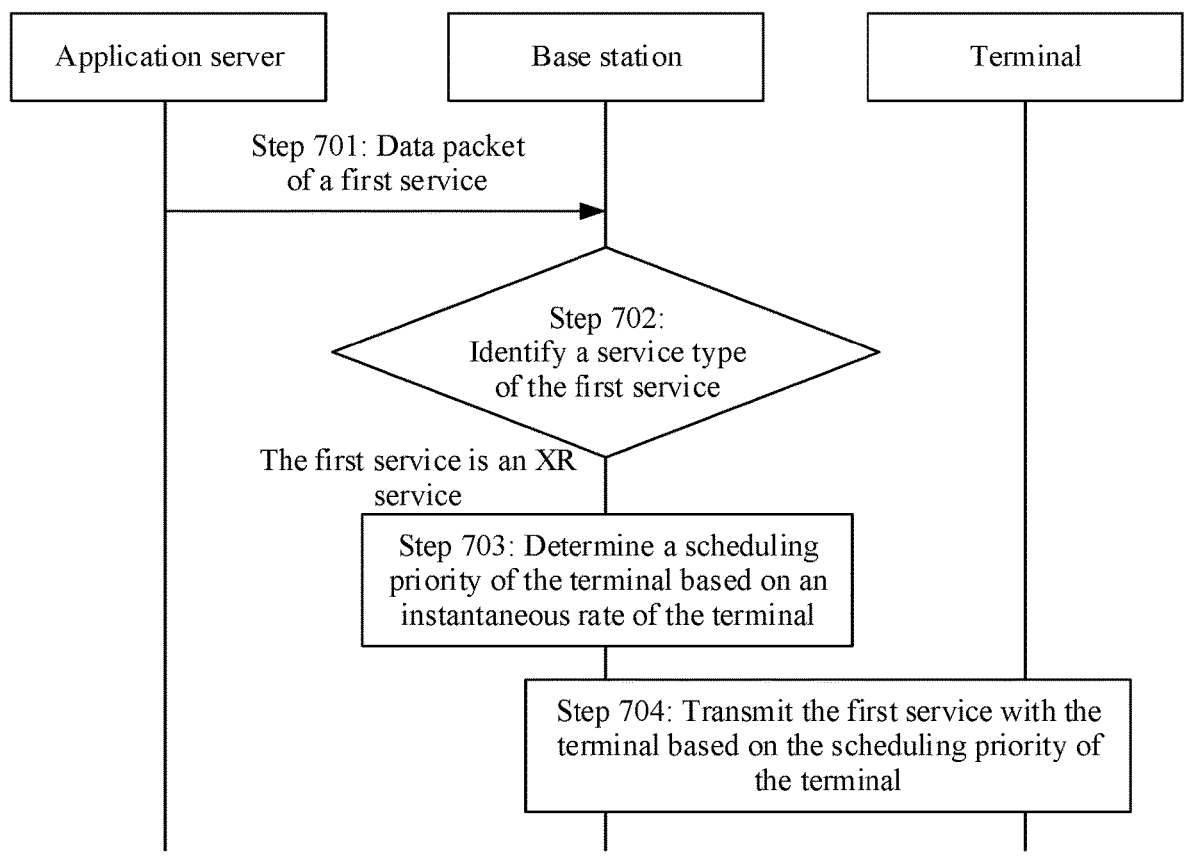
FIG. 7 is a flowchart of another scheduling transmission method according to an embodiment of this application.

With reference to FIG. 7 and FIG. 8A, the following describes a scheduling transmission method in a single-stream transmission mode by using an example in which the access network device is a base station, the first service is an XR service, and an application server sends the first service to a terminal.

FIG. 7 shows another scheduling transmission method according to an embodiment of this application. As shown in FIG. 7, the method may include the following steps.

Step 701: An application server generates a video image of a first service, divides each video frame included in the video image into a plurality of data packets, and sends the data packet (which may be referred to as a data packet of the first service for short) corresponding to the video frame to a base station by using a core network device. Correspondingly, the base station receives the data packet of the first service from the application server.

In the method shown in FIG. 7, the application server may send the data packet of the first service to the base station in the single-stream transmission mode shown in FIG. 1a. A specific process is not described again.

It should be understood that in this embodiment of this application, the data packet of the first service may be replaced with the data packet of the video frame of the first service, the data packet corresponding to the video frame of the first service, or the like. This is not limited.

Step 702: The base station identifies a service type of the first service. If the first service is an XR service, step 703 and step 704 are performed; otherwise, an existing procedure is performed, for example, the data packet of the first service is directly transmitted to a terminal.

For example, the base station may identify the service type of the first service in any one of the following three manners.

Manner 3.1: The base station determines, based on a transmission characteristic of the received data packet of the first service, that the first service is an XR service. The transmission characteristic includes a transmission periodicity and/or a transmitted data volume. In other words, the base station determines the service type of the first service based on an inherent characteristic of the first service when the first service is transmitted.

Manner 3.2: The base station determines, based on a radio bearer used to transmit the data packet of the first service and a correspondence between the radio bearer and a service, that the first service is the XR service.

The radio bearer may include a data radio bearer (data radio bearer, DRB), and the correspondence between the radio bearer and the service may be preconfigured. For example, a DRB1 may be configured to correspond to a service 1, a DRB2 may be configured to correspond to a service 2, and a DRB3 may be configured to correspond to an XR service. If the base station determines that the radio bearer used to transmit the data packet of the first service is the DRB3, the base station may determine that the first service is the XR service.

Manner 3.3: The base station determines, based on a quality of service identifier carried in the data packet of the first service and a correspondence between the quality of service identifier and a service, that the first service is the XR service.

The quality of service identifier may be a 5QI or a quality of service flow identifier (QoS flow identifier, QFI), and the correspondence between the quality of service identifier and a service may be preconfigured. For example, the quality of service identifier is a QFI. A QFI1 may be configured to correspond to a service 1, a QFI2 may be configured to correspond to a service 2, and a QFI3 may be configured to correspond to an XR service. If the data packet of the first service carries the QFI3, the base station may determine, based on the QFI3, that the first service is the XR service.

Step 703: The base station determines a scheduling priority of the terminal based on an instantaneous rate of the terminal.

For related descriptions of the instantaneous rate of the terminal and the scheduling priority of the terminal, refer to the foregoing description. The instantaneous rate of the terminal and the scheduling priority of the terminal satisfy the formula (2):

$$\text{Scheduling Priority of a terminal} = M_1(\text{instantaneous rate}).$$

Step 704: The base station transmits the first service with the terminal based on the scheduling priority of the terminal.

An execution process of step 704 is the same as that of step 502. Details are not described again.

Based on the method shown in FIG. 7, for a single-stream transmission mode of an XR service, a MAX C/I scheduling algorithm that uses an instantaneous rate of a terminal as an input parameter is used to preferentially schedule a terminal with a high instantaneous rate, to maximize a quantity of correctly transmitted video frames of the terminal with a high instantaneous rate, and meet a requirement of a user of the terminal for a frame correct ratio of 99% of the XR service.

FIG. 8A shows still another scheduling transmission method according to an embodiment of this application. As shown in FIG. 8A, the method may include the following steps.

Step 801: An application server generates a video image of a first service, divides each video frame included in the video image into a plurality of data packets, and sends the data packet (which may be referred to as a data packet of the first service for short) corresponding to the video frame to a base station by using a core network device. Correspondingly, the base station receives the data packet of the first service from the application server.

In the method shown in FIG. 8A, the application server may send the data packet of the first service to the base station in the single-stream transmission mode shown in FIG. 1a. A specific process is not described again.

Step 802: The base station identifies a service type of the first service. If the first service is an XR service, step 803 to step 806 are performed; otherwise, an existing procedure is performed, for example, the data packet of the first service is directly transmitted to a terminal.

Specifically, an execution process of step 802 is the same as that of step 702. Details are not described again.

Step 803: The base station obtains an instantaneous rate of the terminal and a second video frame correct ratio of the first service.

For related descriptions of the instantaneous rate of the terminal and an obtaining manner, refer to the description in step 501. For a manner of obtaining the second video frame correct ratio of the first service, refer to the foregoing manner 1 or manner 2. Details are not described again.

Step 804: Determine whether the second video frame correct ratio of the first service is greater than a third threshold. If the second video frame correct ratio of the first service is greater than the third threshold, step 805 and step 806 are performed; otherwise, if the second video frame correct ratio of the first service is less than or equal to the third threshold, transmission of the first service is terminated.

For related descriptions of the third threshold, refer to the foregoing descriptions. Details are not described again.

Step 805: The base station determines a scheduling priority of the terminal based on the instantaneous rate of the terminal and a first parameter.

The first parameter may be described in step 501, and may include a video frame correct ratio of the first service of the terminal, or include a video frame error ratio of the first service. For related descriptions and determining manners of the video frame correct ratio of the first service and the video frame error ratio of the first service, refer to the foregoing description. Details are not described again.

For example, the instantaneous rate of the terminal, the first parameter, and the scheduling priority of the terminal may satisfy the following formula (3):

$$\text{Scheduling priority of a terminal} = M(\text{instantaneous rate of the terminal}, \text{first parameter}) \quad \text{Formula (3)}$$

It should be understood that a design form of the function M is not limited in this embodiment of this application. The function M may be a binary function that satisfies the following case: When the first parameter includes a first video frame correct ratio of the first service of the terminal, the formula (3) may be transformed into Scheduling priority of a terminal=M(instantaneous rate of the terminal, first video frame correct ratio of a first service). The function M satisfies the following correspondence: A higher instantaneous rate of the terminal indicates a higher scheduling priority of the terminal. When the first video frame correct ratio of the first service is less than a target video frame correct ratio of the first service, the first video frame correct ratio of the first service is positively correlated with the scheduling priority of the terminal. When the first video frame correct ratio of the first service is greater than the target video frame correct ratio of the first service, the first video frame correct ratio of the first service is negatively correlated with the scheduling priority of the terminal, or the scheduling priority of the terminal remains unchanged.

When the first parameter includes the video frame error ratio of the first service of the terminal, the formula (3) may be transformed into Scheduling priority of a terminal=M (instantaneous rate of the terminal, video frame error ratio of a first service). The function M satisfies the following correspondence: A higher instantaneous rate of the terminal indicates a higher scheduling priority of the terminal. When the video frame error ratio of the first service is greater than a target video frame error ratio of the first service, the video frame error ratio of the first service is negatively correlated with the scheduling priority of the terminal. For example, a smaller video frame error ratio of the first service indicates a higher scheduling priority of the terminal. When the video frame error ratio of the first service is less than the target video frame error ratio of the first service, the video frame error ratio of the first service is positively correlated with the scheduling priority of the terminal. For example, a smaller video frame error ratio of the first service indicates a lower scheduling priority of the terminal, or the scheduling priority of the terminal remains unchanged.

Specifically, an implementation form of the function M in the formula (3) may be shown in the following formula (4):

$$M(\text{instantaneous of a terminal}, \text{first parameter}) = M_1(\text{instantaneous rate of the terminal}) * M_2(\text{first parameter}) \quad \text{Formula (4)}$$

The symbol "*" in the formula (4) represents multiplication. Larger values of the function $M_1$ and the function $M_2$ indicate a higher scheduling priority of the terminal, and on the contrary, smaller values of the function $M_1$ and the function $M_2$ indicate a lower scheduling priority of the terminal.

As described in the foregoing formula (2), the function $M_1$ may be a monotonically increasing linear function or an exponential function, for example, $M_1$. x is an input variable of the function $M_1$. For example, x may be the instantaneous rate of the terminal, and a higher instantaneous rate of the terminal indicates a higher value of $M_1$(instantaneous rate of the terminal).

The function $M_2$ may be a function that satisfies the following case: In a case in which the first parameter includes the first video frame correct ratio of the first service of the terminal, when the first video frame correct ratio of the first service is less than the target video frame correct ratio of the first service, the first video frame correct ratio of the first service is positively correlated a value of the function $M_2$; or when the first video frame correct ratio of the first service is greater than the target video frame correct ratio of the first service, the first video frame correct ratio of the first service is negatively correlated with a value of the function $M_2$, or a value of the function remains unchanged.

In a case in which the first parameter includes the video frame error ratio of the first service of the terminal, when the video frame error ratio of the first service is greater than the target video frame error ratio of the first service, the video frame error ratio of the first service is negatively correlated with a value of the function $M_2$; or when the video frame error ratio of the first service is less than the target video frame error ratio of the first service, the video frame error ratio of the first service is positively correlated with a value of the function $M_2$, or a value of the function $M_2$ remains unchanged.

In this application, when the first video frame correct ratio of the first service is greater than the target video frame correct ratio of the first service (or in other words, the video frame error ratio of the first service is less than the target video frame error ratio of the first service), the scheduling priority of the terminal is lower than a scheduling priority corresponding to the target video frame correct ratio of the first service (or the target video frame error ratio of the first service). For example, a difference between a value corresponding to the scheduling priority corresponding to the target video frame correct ratio (or the target video frame error ratio of the first service) of the first service and a value corresponding to the scheduling priority of the terminal is less than a second threshold. The second threshold may be set as required. This is not limited. In this way, for a terminal device whose video frame correct ratio exceeds the target video frame correct ratio (or whose video frame correct ratio is lower than the target video frame error ratio), a scheduling priority of the terminal is slightly reduced, but the scheduling priority cannot be excessively low, to ensure a video frame correct ratio requirement of the terminal.

For example, the first service is an XR service, and the target video frame correct ratio of the XR service is 99%. In the single-stream transmission mode, the function $M_2$ may be the following function, where x is an input variable of the function $M_2(x)$. For example, x may be a video frame correct ratio of the XR service.

$$M_2(x) = \begin{cases} 10x, & x \in [0\%, 99\%] \\ -90x + 99, & x \in [99\%, 100\%] \end{cases}$$

Figure 8B:
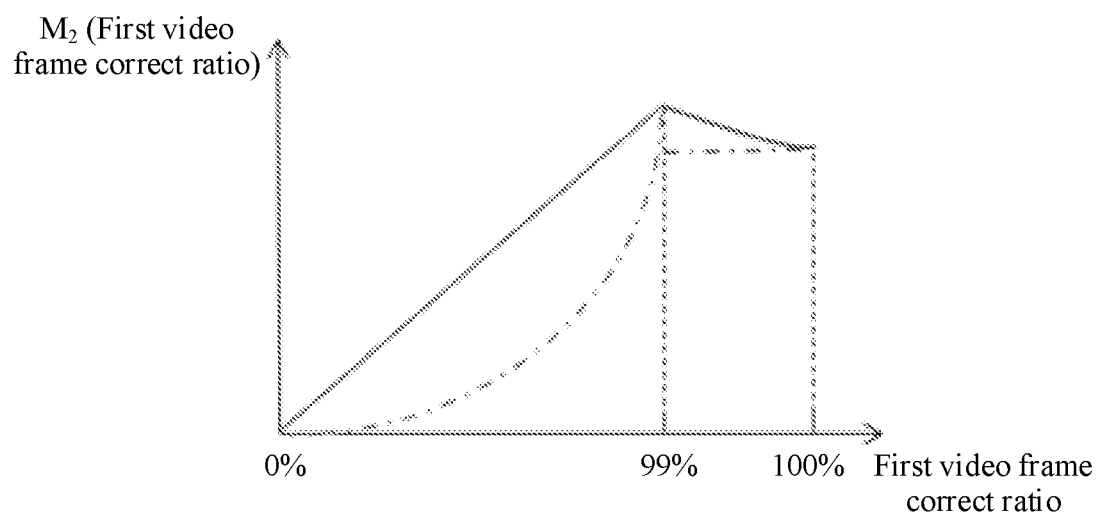
FIG. 8B is a schematic diagram of a correspondence between a video frame correct ratio and a scheduling priority.

It should be understood that this application is not limited to an implementation form of the function $M_2$. For another example, FIG. 8B shows a correspondence between the first video frame correct ratio of the first service and a value of the function $M_2$. In FIG. 8B, a horizontal axis represents the video frame correct ratio of the XR service, and a vertical axis represents a calculation result obtained by inputting the video frame correct ratio of the XR service into the function $M_2(x)$. 99% in FIG. 8B is the target video frame correct ratio. As shown by a solid line or a dashed line in FIG. 8B, for a terminal whose video frame correct ratio is less than or equal to 99%, the value of the function $M_2$ increases as the video frame correct ratio increases, but does not exceed a scheduling priority corresponding to the target frame correct ratio; and for a terminal whose video frame correct ratio is greater than 99%, the value of the function $M_2$ may decrease slightly.

It should be noted that, before the base station obtains the frame correct ratio of the terminal, a midpoint value (that is, ½ of a value range) of the value range of the function $M_2$ may be used as the calculation result of $M_2$(first video frame correct ratio of a first service) in the formula (4).

Step 806: The base station transmits the first service with the terminal based on the scheduling priority of the terminal.

An execution process of step 806 is the same as that of step 502. Details are not described again.

Based on the method shown in FIG. 8A, for a single-stream transmission mode of an XR service, a video frame correct ratio when a terminal transmits an XR service is considered, and transmission of the XR service of a terminal with a low video frame correct ratio is terminated, to save scheduling resources. In addition, a higher scheduling priority is assigned to a terminal whose video frame correct ratio is closer to 99%, and a scheduling priority of a terminal whose video frame correct ratio exceeds 99% is slightly reduced. In this way, more terminals can meet a video frame correct ratio requirement of 99% of the XR service.

Figure 9:
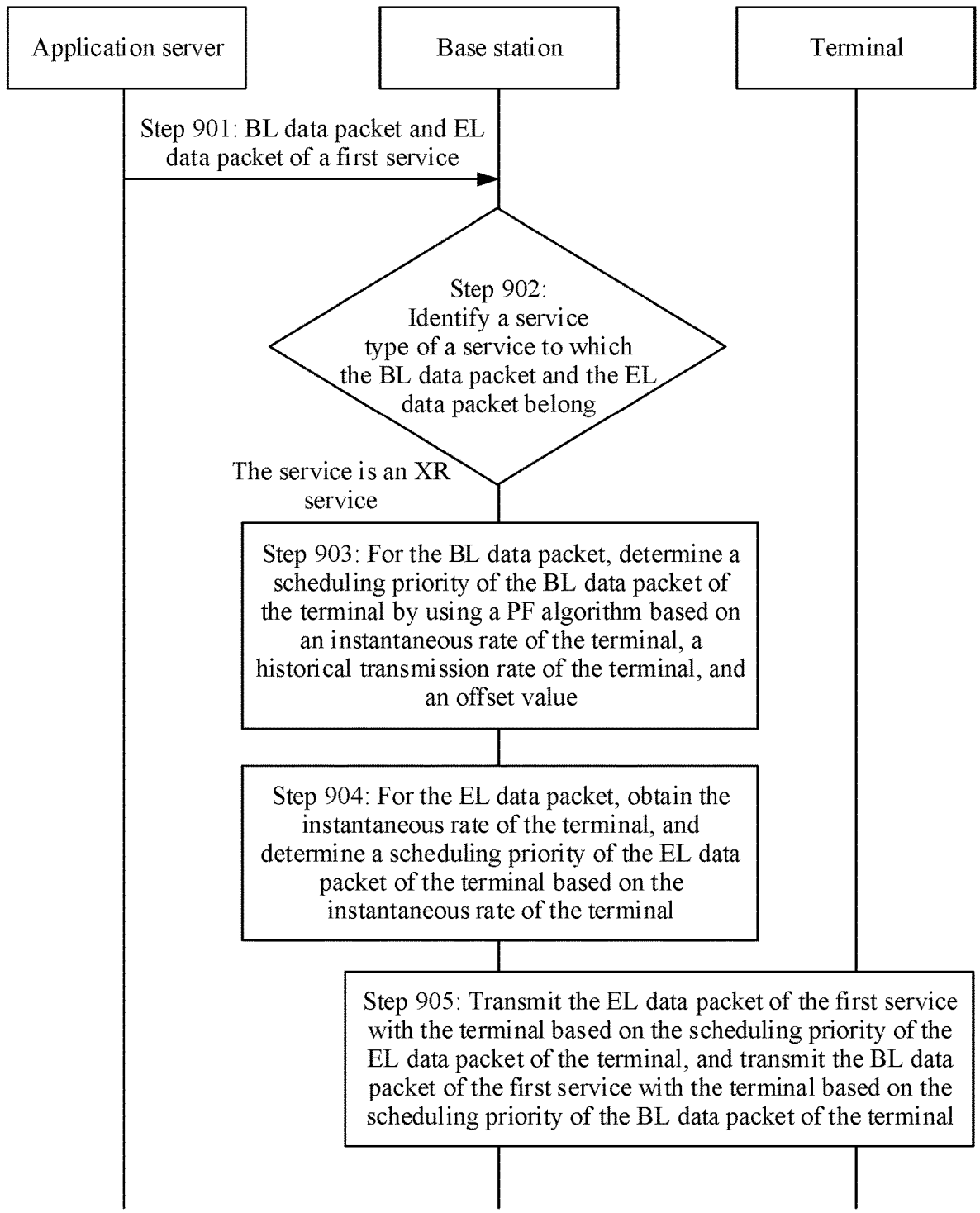
FIG. 9 is a flowchart of yet another scheduling transmission method according to an embodiment of this application.

In FIG. 7 and FIG. 8A, an example in which the XR is transmitted in the single-stream transmission mode is used to describe the scheduling transmission method provided in embodiments of this application. With reference to FIG. 9 and FIG. 10A, the following describes a scheduling transmission method in a multi-stream transmission mode.

FIG. 9 shows yet another scheduling transmission method according to an embodiment of this application. As shown in FIG. 9, the method may include the following steps.

Step 901: An application server generates a video image of a first service, divides each video frame included in the video image into a plurality of data packets, performs encoding processing on each data packet to generate a corresponding EL data packet and a corresponding BL data packet, and sends the BL data packet and the EL data packet to a base station by using a core network device. Correspondingly, the base station receives the BL data packet and the EL data packet of the first service from the application server.

In the method shown in FIG. 9, the application server may send the BL data packet and the EL data packet of the first service to the base station in the multi-stream transmission mode shown in FIG. 1b. A specific process is not described again.

Step 902: The base station identifies a service type of a service to which the received BL data packet and the EL data packet belong, and if it is identified that the service to which the BL data packet and the EL data packet belong is an XR service, step 903 to step 905 are performed; otherwise, an existing procedure is performed, for example, the BL data packet and the EL data packet are directly transmitted to a terminal according to the conventional technology.

Specifically, for a process of identifying the service type of the service in step 902, refer to the description in step 702. Details are not described again.

Step 903: For the BL data packet, the base station determines a scheduling priority of the BL data packet of the terminal by using the foregoing PF algorithm based on an instantaneous rate of the terminal, a historical transmission rate of the terminal, and an offset value.

The instantaneous rate of the terminal, the historical transmission rate of the terminal, the offset value A, and the scheduling priority BL_PF of the terminal satisfy the following formula:

$$BL\_PF = \frac{R_{instant}}{R_{history}} + \Delta$$

For related descriptions of $R_{instant}$, $R_{history}$, and $R_{hinstory}$, refer to the description in the PF algorithm shown in the foregoing formula (1). Details are not described again.

Step 904: For the EL data packet, the base station obtains the instantaneous rate of the terminal, and determines a scheduling priority of the EL data packet of the terminal based on the instantaneous rate of the terminal.

The instantaneous rate of the terminal and the scheduling priority of the EL data packet of the terminal satisfy the following formula:

Scheduling priority of an EL data packet of a terminal=$M_1$(instantaneous rate)

For a related description of the function $M_1$(instantaneous rate), refer to the description in the foregoing formula (2). Details are not described again.

Step 905: The base station transmits the EL data packet of the first service with the terminal based on the scheduling priority of the EL data packet of the terminal, and transmits the BL data packet of the first service with the terminal based on the scheduling priority of the BL data packet of the terminal.

For an execution process of step 905, refer to the descriptions of step 502. Details are not described again.

Based on the method shown in FIG. 9, for a multi-stream transmission mode of an XR service, a BL data packet and an EL data packet of the XR service are first identified. Then, during scheduling priority calculation, a scheduling priority of the BL data packet is calculated by using a PF algorithm, so that most BL data packets of a terminal are transmitted correctly as much as possible, and basic experience of the terminal is ensured. In addition, a MAX C/I scheduling algorithm that uses an instantaneous rate of the terminal as an input parameter is used to calculate a scheduling priority of the EL data packet, a quantity of correctly transmitted frames to which an EL data packet of a terminal with a high instantaneous rate belongs is maximized, so that the terminal can further meet a frame correct ratio requirement of 50% of the EL frame.

FIG. 10A shows yet still another scheduling transmission method according to an embodiment of this application. As shown in FIG. 10A, the method may include the following steps.

Step 1001: An application server generates a video image of a first service, divides each video frame included in the video image into a plurality of data packets, performs encoding processing on each data packet to generate a corresponding EL data packet and a corresponding BL data packet, and sends the BL data packet and the EL data packet to a base station by using a core network device. Correspondingly, the base station receives the BL data packet and the EL data packet of the first service from the application server.

In the method shown in FIG. 10A, the application server may send the BL data packet and the EL data packet of the first service to the base station in the multi-stream transmission mode shown in FIG. 1b. A specific process is not described again.

Step 1002: The base station identifies a service type of a service to which the received BL data packet and the EL data packet belong, and if it is identified that the service to which the BL data packet and the EL data packet belong is an XR service, step 1003 to step 1007 are performed; otherwise, an existing procedure is performed, for example, the BL data packet and the EL data packet are directly transmitted to a terminal according to the conventional technology.

Specifically, for a process of identifying the service type of the service in step 1002, refer to the description in step 702. Details are not described again.

Step 1003: For the BL data packet, the base station determines a scheduling priority of the BL data packet of the terminal by using the foregoing PF algorithm based on an instantaneous rate of the terminal, a historical transmission rate of the terminal, and an offset value.

The instantaneous rate of the terminal, the historical transmission rate of the terminal, the offset value A, and the scheduling priority BL_PF of the terminal satisfy the following formula:

$$BL\_PF = \frac{R_{instant}}{R_{history}} + \Delta$$

For related descriptions of $R_{instant}$, $R_{history}$, and $R_{instant}/R_{history}$ refer to the description in the PF algorithm shown in the foregoing formula (1). Details are not described again.

Step 1004: For the EL data packet, the base station obtains a second video frame correct ratio of the first service.

The second video frame correct ratio may be replaced with an EL frame correct ratio of the first service. Specifically, the second video frame correct ratio of the first service may be obtained with reference to the foregoing manner 1 or manner 2. Details are not described again.

Step 1005: If the second video frame correct ratio of the first service is greater than a third threshold, step 1006 and step 1007 are performed; otherwise, if the second video frame correct ratio of the first service is less than or equal to the third threshold, transmission of the EL data packet of the first service is terminated.

For related descriptions of the third threshold, refer to the foregoing descriptions. Details are not described again.

Step 1006: The base station determines a scheduling priority of the EL data packet of the terminal based on the instantaneous rate of the terminal and a first parameter.

The first parameter may include the EL frame correct ratio of the first service or an EL frame error ratio of the first service. Specifically, the EL frame correct ratio of the first service or the EL frame error ratio of the first service may be determined with reference to the foregoing manner 1 or manner 2.

For example, the instantaneous rate of the terminal, the first parameter, and the scheduling priority of the EL data packet of the terminal satisfies the following formula (5):

Scheduling priority of an EL data packet of a terminal=M(instantaneous rate of the terminal, first parameter)　　　Formula (5)

It should be understood that, a design form of the function M in the formula (5) is not limited in this embodiment of this application, and the function M in the formula (5) may be a binary function that satisfies the following case:

When the first parameter includes the EL frame correct ratio of the first service of the terminal, the formula (5) may be transformed into Scheduling priority of an EL data packet of a terminal=M(instantaneous rate of the terminal, EL frame correct ratio of a first service). The function M satisfies the following correspondence: A higher instantaneous rate of the terminal indicates a higher scheduling priority of the EL data packet of the terminal. When the EL frame correct ratio of the first service is less than a target video frame correct ratio of the first service, the EL frame correct ratio of the first service is positively correlated with the scheduling priority of the EL data packet of the terminal. When the EL frame correct ratio of the first service is greater than the target video frame correct ratio of the first service, the EL frame correct ratio of the first service is negatively correlated with the scheduling priority of the EL data packet of the terminal, or the scheduling priority of the EL data packet of the terminal remains unchanged.

When the first parameter includes the EL frame error ratio of the first service of the terminal, the formula (5) may be transformed into Scheduling priority of an EL data packet of a terminal=M(instantaneous rate of the terminal, EL frame error ratio of a first service). The function M satisfies the following correspondence: A higher instantaneous rate of the terminal indicates a higher scheduling priority of the EL data packet of the terminal. When the EL frame error ratio of the first service is greater than the target video frame error ratio of the first service, the EL frame error ratio of the first service is negatively correlated with the scheduling priority of the EL data packet of the terminal. For example, a lower EL frame error ratio of the first service indicates a higher scheduling priority of the EL data packet of the terminal. When the EL frame error ratio of the first service is less than the target video frame error ratio of the first service, the EL frame error ratio of the first service is positively correlated with the scheduling priority of the EL data packet of the terminal. For example, a lower EL frame error ratio of the first service indicates a lower scheduling priority of the EL data packet of the terminal, or the scheduling priority of the EL data packet of the terminal remains unchanged.

It should be understood that in the method shown in FIG. 10A, the target video frame correct ratio of the first service may be a target EL frame correct ratio of the first service, and the target video frame error ratio of the first service may be a target EL frame error ratio of the first service.

Specifically, an implementation form of the function M in the formula (5) may be shown in the following formula (6):

$M$(instantaneous rate of a terminal,first parameter)
$= M_1$(instantaneous rate of the terminal)$*M_3$(first parameter)     Formula (6)

The symbol "*" in the formula (6) represents multiplication. Larger values of the function $M_1$ and the function $M_3$ indicate a higher scheduling priority of the EL data packet of the terminal, and on the contrary, a smaller value of $M_1*M_3$ indicates a lower scheduling priority of the EL data packet of the terminal.

As described in the foregoing formula (2), $M_1$ may be a monotonically increasing linear function or an exponential function, for example, $M_1=2x-0.99$. x is an input variable of the function $M_1$. For example, x is the instantaneous rate of the terminal, and a higher instantaneous rate of the terminal indicates a higher value of $M_1$(instantaneous rate of the terminal).

This application is not limited to a design form of the function $M_3$, and the function $M_3$ may be a function that meets the following cases:

In a case in which the first parameter includes the EL frame correct ratio of the first service of the terminal, when the EL frame correct ratio of the first service is less than the target video frame correct ratio of the first service, the EL frame correct ratio of the first service is positively correlated with a value of the function $M_3$. When the EL frame correct ratio of the first service is greater than the target video frame correct ratio of the first service, the EL frame correct ratio of the first service is negatively correlated with a value of the function $M_3$, or a value of the function $M_3$ remains unchanged.

In a case in which the first parameter includes the EL frame error ratio of the first service of the terminal, when the EL frame error ratio of the first service is greater than the target video frame error ratio of the first service, the EL frame error ratio of the first service is negatively correlated with a value of the function $M_3$. When the EL frame error ratio of the first service is less than the target video frame error ratio of the first service, the EL frame error ratio of the first service is positively correlated with a value of the function $M_3$, or a value of the function $M_3$ remains unchanged.

In this application, when the EL frame correct ratio of the first service is greater than the target video frame correct ratio of the first service (or in other words, the EL error ratio of the first service is less than the target video frame error ratio of the first service), the scheduling priority of the EL data packet of the terminal is lower than a scheduling priority of an EL data packet corresponding to the target video frame correct ratio of the first service (or the target video frame error ratio of the first service). For example, a difference between a value corresponding to the scheduling priority of the EL data packet corresponding to the target video frame correct ratio of the first service (or the target video frame error ratio of the first service) and a value corresponding to the scheduling priority of the EL data packet of the terminal is less than a second threshold. The second threshold may be set as required. This is not limited.

In this way, for a terminal whose video frame correct ratio exceeds the target video frame correct ratio (or whose video frame correct ratio is less than the target video frame error ratio), a scheduling priority of an EL data packet of the terminal is slightly reduced, but the scheduling priority cannot be excessively low, to ensure a video frame correct ratio requirement of the terminal.

For example, the first service is an XR service, and the target video frame correct ratio of an EL frame of the XR service is 50%. In the multi-stream transmission mode, the function $M_3$ may be the following function, and x is an input variable of the function $M_3(x)$, for example, x may be an EL frame correct ratio of the XR service.

$$M_3(x) = \begin{cases} 10x, & x \in [0\%, 50\%] \\ -2x + 6, & x \in [50\%, 100\%] \end{cases}$$

Figure 10B:
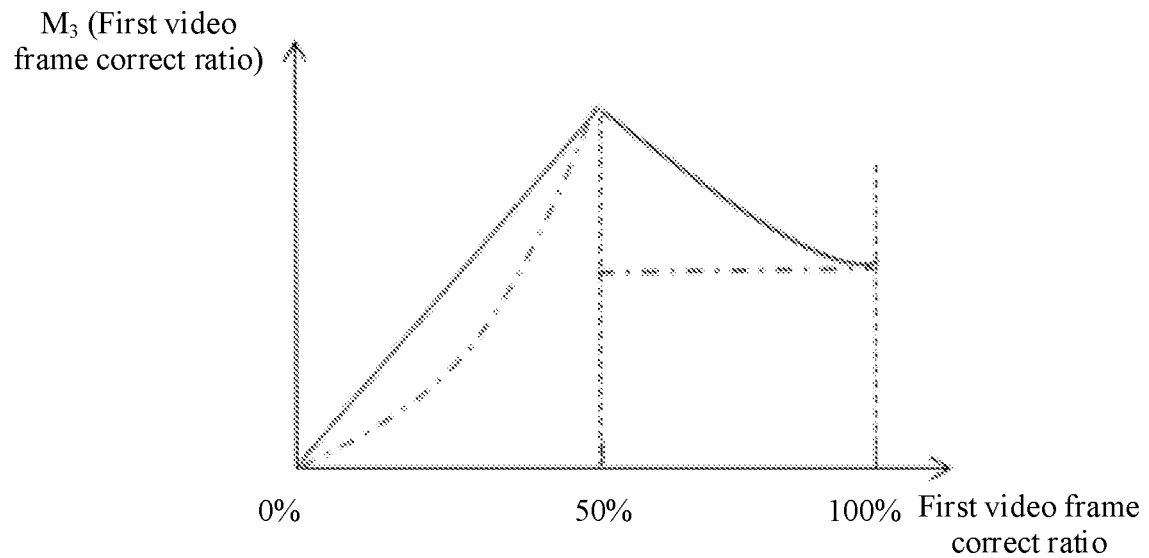
FIG. 10B is a schematic diagram of a correspondence between a video frame correct ratio and a scheduling priority.

It should be understood that this application is not limited to an implementation form of the function $M_3(x)$. For example, FIG. 10B shows a correspondence between the EL frame correct ratio of the first service and a value of the function $M_3$. In FIG. 10B, a horizontal axis represents the EL frame correct ratio, and a vertical axis represents a calculation result obtained by inputting the EL frame correct ratio into the function $M_3$. 50% in FIG. 10B is a target video frame correct ratio. As shown by a solid line or a dashed line in FIG. 10B, for a terminal whose video frame correct ratio≤50%, a value of the function $M_3$ increases as the video frame correct ratio increases, but does not exceed a value corresponding to 50%. For a terminal whose video frame correct ratio≥50%, a value of the function $M_3$ may decrease slightly.

It should be noted that, before the base station obtains the frame correct ratio of the terminal, a midpoint value (that is, ½ of a value range) of the value range of the function $M_3$ may be used as a calculation result of $M_3$(first video frame correct ratio) in the formula (6).

Step 1007: The base station transmits the EL data packet of the first service with the terminal based on the scheduling priority of the EL data packet of the terminal, and transmits the BL data packet of the first service with the terminal based on the scheduling priority of the BL data packet of the terminal.

For an execution process of step 1007, refer to the descriptions of step 502. Details are not described again.

Based on the method shown in FIG. 10A, for a multi-stream transmission mode of an XR service, a BL data packet and an EL data packet of the XR service are first identified. Then, during scheduling priority calculation, a scheduling priority of the BL data packet is calculated by using a PF algorithm, so that most BL data packets of a terminal are transmitted correctly as much as possible, and basic experience of the terminal is ensured. In addition, for the EL data packet, a video frame correct ratio when the terminal transmits the EL data packet is considered, and transmission of an EL packet of a terminal with a low video frame correct ratio is terminated, to save scheduling resources. In addition, for a terminal with a high video frame correct ratio, a scheduling algorithm that uses an instantaneous rate of the terminal and a video frame correct ratio as input parameters is used to calculate a scheduling priority of the EL data packet. A higher scheduling priority is assigned to a terminal with an EL frame correct ratio closer to 50%, and a scheduling priority of a terminal with an EL frame correct ratio higher than 50% is slightly lowered, so that more terminals can meet a video frame correct ratio requirement of 50% of an EL frame.

The foregoing mainly describes the solutions provided in embodiments of this application from a perspective of interaction between nodes. It may be understood that, to implement the foregoing functions, the nodes such as the access network device and the terminal include corresponding hardware structures and/or software modules for performing the functions. A person skilled in the art should be easily aware that algorithm steps in examples described with reference to embodiments disclosed in this specification can be implemented in a form of hardware, software, or a combination of hardware and computer software in the methods in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In the embodiments of this application, function modules of the access network device and the terminal may be divided based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in embodiments of this application, module division is an example, and is merely a logical function division. In actual implementation, another division manner may be used.

Figure 11:
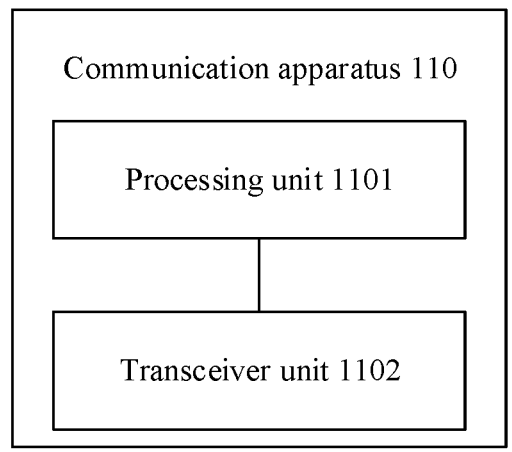
FIG. 11 is a schematic composition diagram of a communication apparatus 110 according to an embodiment of this application.

FIG. 11 is a schematic diagram of a structure of a communication apparatus 110. The communication apparatus 110 may be an access network device, a chip in an access network device, a system on chip, another apparatus that can implement a function of the access network device in the foregoing method, or the like. The communication apparatus 110 may be configured to perform a function of the access network device in the foregoing method embodiments. In an implementation, the communication apparatus 110 shown in FIG. 11 includes a processing unit 1101 and a transceiver unit 1102.

The processing unit 1101 is configured to determine a scheduling priority of a terminal based on an instantaneous rate of the terminal and a service type of a first service of the terminal, where the instantaneous rate of the terminal is positively correlated with the scheduling priority of the terminal, and a target video frame correct ratio of the first service is greater than a first threshold. For example, the processing unit 1101 may be configured to support the communication apparatus 110 in performing step 501, step 703, step 805, step 904, and step 1006.

The processing unit 1101 is further configured to control, based on the scheduling priority of the terminal, the transceiver unit 1102 to transmit the first service with the terminal. For example, the processing unit 1101 is further configured to support the communication apparatus 110 in performing step 502, step 704, step 806, step 905, and step 1007.

Specifically, all related content of the steps in the foregoing method embodiments shown in FIG. 5 to FIG. 10A may be cited in function descriptions of the corresponding function modules. Details are not described herein again. The communication apparatus 110 is configured to perform a function of the access network device in the scheduling transmission method shown in the methods shown in FIG. 5 to FIG. 10A, and therefore can achieve a same effect as that of the foregoing scheduling transmission methods.

In another implementation, the communication apparatus 110 shown in FIG. 11 includes a processing module and a communication module. The processing module is configured to control and manage an action of the communication apparatus 110. For example, the processing module may integrate a function of the processing unit 1101, and may be configured to support the communication apparatus 110 in performing steps such as step 501, step 703, step 805, step 904, and step 1006. The communication module may integrate a function of the transceiver unit 1102, and communicate with another network entity, for example, communicate with a function module or a network entity shown in any communication system in FIG. 2 to FIG. 3d. Further, the communication apparatus 110 may further include a storage module, configured to store instructions and/or data. When the instructions are executed by the processing module, the processing module is enabled to implement the method on the access network device side.

The processing module may be a processor, a controller, a module, or a circuit. The processing module may implement or execute various example logical blocks described with reference to content disclosed in embodiments of this application. The communication module may be a transceiver circuit, a pin, an interface circuit, a bus interface, a communication interface, or the like. The storage module may be a memory. When the processing module is the processor, the communication module is the communication interface, and the storage module is the memory, the communication apparatus 110 in this embodiment of this application may be the communication apparatus shown in FIG. 4.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory may be a non-volatile memory, such as a hard disk drive (hard disk drive, HDD) or a solid-state drive (solid-state drive, SSD), or may be a volatile memory (volatile memory), such as a random-access memory (random-access memory, RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store instructions and/or data.

Figure 12:
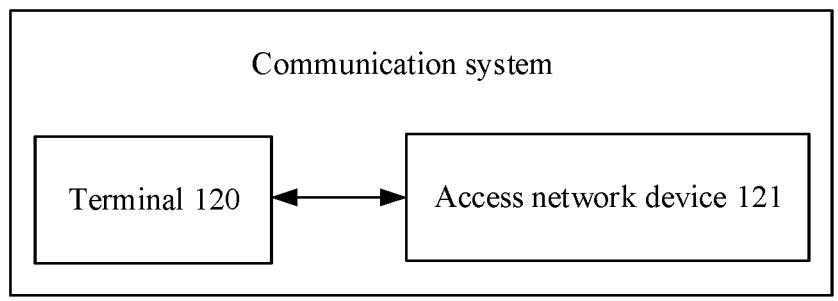
FIG. 12 is a schematic composition diagram of a communication system according to an embodiment of this application.

FIG. 12 is a schematic diagram of a structure of a communication system according to an embodiment of this application. As shown in FIG. 12, the communication system may include a terminal 120 and an access network device 121. It should be noted that FIG. 12 is merely an example of an accompanying drawing. Network elements included in the communication system shown in FIG. 12 and a quantity of the network elements are not limited in this embodiment of this application.

The terminal 120 has functions of the terminal in the one or more methods shown in FIG. 5 to FIG. 10A. The access network device 121 has functions of the access network device in the one or more methods shown in FIG. 5 to FIG. 10A.

In embodiments of this application, "/" may represent an "or" relationship between 10 associated objects. For example, A/B may represent A or B. "And/or" may be used to indicate that there are three relationships between associated objects. For example, A and/or B may represent the following three cases: Only A exists, both A and B exist, and only B exists. A and B may be singular or plural. To facilitate description of the technical solutions in embodiments of this application, in embodiments of this application, terms such as "first" and "second" may be used to distinguish between technical features with same or similar functions. The terms such as "first" and "second" do not limit a quantity and an execution sequence, and the terms such as "first" and "second" do not indicate a definite difference. In embodiments of this application, the term such as "example" or "for example" is used to represent an example, an illustration, or a description. Any embodiment or design scheme described with "example" or "for example" should not be explained as being more preferred or having more advantages than another embodiment or design scheme. Use of the term such as "example" or "for example" is intended to present a related concept in a specific manner for ease of understanding.

In embodiments of this application, "first", "second", "third", "A", "B", "C", "D", and the like are used for distinguishing between technical features described by them. There is no chronological order or no size order between the technical features described by "first", "second", "third", "A", "B", "C", and "D".

It should be understood that in the embodiments of this application, "B corresponding to A" indicates that B is associated with A. For example, B may be determined based on A. It should be further understood that determining B based on A does not mean that B is determined based only on A. B may alternatively be determined based on A and/or other information. In addition, in embodiments of this application, "connection" means various connection manners such as a direct connection or an indirect connection, for implementing communication between devices. This is not limited in embodiments of this application.

In embodiments of this application, unless otherwise specified, "transmission" (transmit/transmission) refers to bidirectional transmission, and includes a sending action and/or a receiving action. Specifically, "transmission" in embodiments of this application includes data sending, data receiving, or data sending and data receiving. In other words, data transmission herein includes uplink data transmission and/or downlink data transmission. Data may include a channel and/or a signal. The uplink data transmission is uplink channel transmission and/or uplink signal transmission, and the downlink data transmission is downlink channel transmission and/or downlink signal transmission. In embodiments of this application, a "network" and a "system" express a same concept, and a communication system is a communication network.

Division into the modules in embodiments of this application is an example, is merely division into logical functions, and may be other division during actual implementation. In addition, function modules in embodiments of this application may be integrated into one processor, or each of the modules may exist alone physically, or two or more modules may be integrated into one module. The integrated module may be implemented in a form of hardware, or may be implemented in a form of a software function module.

All or a part of the technical solutions provided in embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, a wireless control apparatus, an access network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium, or the like.

In embodiments of this application, when there is no logical conflict, embodiments may be mutually referenced. For example, methods and/or terms in the method embodiments may be mutually referenced, and functions and/or terms in the apparatus embodiments may be mutually referenced. For example, functions and/or terms between the apparatus embodiments and the method embodiments may be mutually referenced.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of the embodiments of this application shall be subject to the protection scope of the claims.

What is claimed is:

1. A scheduling transmission method, comprising:
    determining a scheduling priority of a terminal based on an instantaneous rate of the terminal, a service type of a first service of the terminal and a first parameter indicating a first video frame correct ratio of the first service, wherein the instantaneous rate of the terminal is positively correlated with the scheduling priority of the terminal, and a target video frame correct ratio of the first service is greater than a first threshold; and
    transmitting the first service of the terminal based on the scheduling priority of the terminal.

2. The method of claim 1, wherein
    in a case that the first video frame correct ratio of the first service is less than the target video frame correct ratio of the first service, the first video frame correct ratio of the first service is positively correlated with the scheduling priority of the terminal.

3. The method of claim 1, wherein
in a case that the first video frame correct ratio of the first service is greater than the target video frame correct ratio of the first service, the first video frame correct ratio of the first service is negatively correlated with the scheduling priority of the terminal, or the scheduling priority of the terminal remains unchanged; and
the scheduling priority of the terminal is lower than a scheduling priority corresponding to the target video frame correct ratio of the first service.

4. The method of claim 3, wherein that the scheduling priority of the terminal is lower than the scheduling priority corresponding to the target video frame correct ratio of the first service comprises:
a difference between a value that corresponds to the scheduling priority corresponding to the target video frame correct ratio of the first service and a value corresponding to the scheduling priority of the terminal is less than a second threshold.

5. The method of claim 1, wherein the determining the scheduling priority of the terminal comprises:
in a case that a second video frame correct ratio of the first service is greater than a third threshold, determining the scheduling priority of the terminal based on the instantaneous rate of the terminal and the service type of the first service of the terminal.

6. The method of claim 5, the method further comprising:
in a case that the second video frame correct ratio of the first service is less than or equal to the third threshold, terminating transmission of the first service.

7. An apparatus, comprising:
one or more processors; and
a non-transitory memory having instructions stored thereon that, when executed by the one or more processors, cause the apparatus to:
determine a scheduling priority of a terminal based on an instantaneous rate of the terminal, a service type of a first service of the terminal and a first parameter indicating a first video frame correct ratio of the first service, wherein the instantaneous rate of the terminal is positively correlated with the scheduling priority of the terminal, and a target video frame correct ratio of the first service is greater than a first threshold; and
transmit the first service of the terminal based on the scheduling priority of the terminal.

8. The apparatus of claim 7, wherein in a case that the first video frame correct ratio of the first service is less than the target video frame correct ratio of the first service, the first video frame correct ratio of the first service is positively correlated with the scheduling priority of the terminal.

9. The apparatus of claim 7, wherein in a case that the first video frame correct ratio of the first service is greater than the target video frame correct ratio of the first service, the first video frame correct ratio of the first service is negatively correlated with the scheduling priority of the terminal, or the scheduling priority of the terminal remains unchanged, and the scheduling priority of the terminal is lower than a scheduling priority corresponding to the target video frame correct ratio of the first service.

10. The apparatus of claim 9, wherein that the scheduling priority of the terminal is lower than a scheduling priority corresponding to the target video frame correct ratio of the first service, comprises:
a difference between a value that corresponds to the scheduling priority corresponding to the target video frame correct ratio of the first service and a value corresponding to the scheduling priority of the terminal is less than a second threshold.

11. The apparatus of claim 7, wherein that the instructions cause the apparatus to determine the scheduling priority of the terminal, comprises:
in a case that a second video frame correct ratio of the first service is greater than a third threshold, the apparatus is caused to determine the scheduling priority of the terminal based on the instantaneous rate of the terminal and the service type of the first service of the terminal.

12. The apparatus of claim 11, wherein in a case that the second video frame correct ratio of the first service is less than or equal to the third threshold, the instructions further cause the apparatus to terminate transmission of the first service.

13. A non-transitory computer readable medium storing instructions that are executable by a computer, the non-transitory computer readable medium is applied to a first communication apparatus, and the instructions comprise instructions for:
determine a scheduling priority of a terminal based on an instantaneous rate of the terminal, a service type of a first service of the terminal and a first parameter indicating a first video frame correct ratio of the first service, wherein the instantaneous rate of the terminal is positively correlated with the scheduling priority of the terminal, and a target video frame correct ratio of the first service is greater than a first threshold; and
transmit the first service of the terminal based on the scheduling priority of the terminal.

14. The non-transitory computer readable medium of claim 13, wherein
in a case that the first video frame correct ratio of the first service is less than the target video frame correct ratio of the first service, the first video frame correct ratio of the first service is positively correlated with the scheduling priority of the terminal.

15. The non-transitory computer readable medium of claim 13, wherein
in a case that the first video frame correct ratio of the first service is greater than the target video frame correct ratio of the first service, the first video frame correct ratio of the first service is negatively correlated with the scheduling priority of the terminal, or the scheduling priority of the terminal remains unchanged; and
the scheduling priority of the terminal is lower than a scheduling priority corresponding to the target video frame correct ratio of the first service.

16. The non-transitory computer readable medium of claim 13, wherein the determining the scheduling priority of the terminal comprises:
in a case that a second video frame correct ratio of the first service is greater than a third threshold, determining the scheduling priority of the terminal based on the instantaneous rate of the terminal and the service type of the first service of the terminal.

17. The non-transitory computer readable medium of claim 16, wherein the instructions further comprise instructions for:
terminating transmission of the first service in a case that the second video frame correct ratio of the first service is less than or equal to the third threshold.

* * * * *